(12) United States Patent
Merino et al.

(10) Patent No.: US 12,581,282 B2
(45) Date of Patent: Mar. 17, 2026

(54) VIRTUAL NETWORK (VN) GROUP AUTOMATION FOR DYNAMIC SHARED DATA IN 5G CORE NETWORK (5GC)

(71) Applicant: Telefonaktiebolaget LM Ericsson (publ), Stockholm (SE)

(72) Inventors: Emiliano Merino, Leganés (ES); Juan Manuel Fernandez Galmes, Getafe (ES); Jose Miguel Dopico, Torrelodones (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 61 days.

(21) Appl. No.: 18/730,099

(22) PCT Filed: Jan. 20, 2023

(86) PCT No.: PCT/EP2023/051382
§ 371 (c)(1),
(2) Date: Jul. 18, 2024

(87) PCT Pub. No.: WO2023/144035
PCT Pub. Date: Aug. 3, 2023

(65) Prior Publication Data
US 2025/0150807 A1    May 8, 2025

(30) Foreign Application Priority Data
Jan. 26, 2022    (EP) .................................... 22382057

(51) Int. Cl.
| | |
|---|---|
| *G06F 15/173* | (2006.01) |
| *H04L 41/0806* | (2022.01) |
| *H04L 41/0895* | (2022.01) |
| *H04W 8/18* | (2009.01) |

(52) U.S. Cl.
CPC ........... *H04W 8/18* (2013.01); *H04L 41/0806* (2013.01); *H04L 41/0895* (2022.05)

(58) Field of Classification Search
CPC ... H04W 8/18; H04L 41/0895; H04L 41/0806
See application file for complete search history.

(56) References Cited

U.S. PATENT DOCUMENTS

| | | | | |
|---|---|---|---|---|
| 10,999,787 B2 * | 5/2021 | Dao | ...................... | H04W 48/18 |
| 2020/0008046 A1 | 1/2020 | Hua et al. | | |

(Continued)

OTHER PUBLICATIONS

International Search Report and Written Opinion dated May 24, 2023 for International Application No. PCT/EP2023/051382 filed Jan. 20, 2023, consisting of 8 pages.

(Continued)

*Primary Examiner* — Duyen M Doan
(74) *Attorney, Agent, or Firm* — Weisberg I.P. Law, P.A.

(57) ABSTRACT

The application relates to a method carried out at a management entity configured to manage subscriber data of a plurality of subscribers in a cellular network. The method includes determining, based at least one group parameter, that a shared data identifier should be used for a virtual network group of subscribers, wherein members of the group of subscribers are among the plurality of subscribers and share at least one common parameter identified by the shared data identifier, and initiating a generation of the shared data identifier to be used for the group of subscribers, and associating the shared data identifier with each member of the group of subscribers.

22 Claims, 17 Drawing Sheets

(56)                    References Cited

U.S. PATENT DOCUMENTS

| | | | | |
|---|---|---|---|---|
| 2020/0374687 A1* | 11/2020 | Hua | .......................... | H04W 8/12 |
| 2022/0060881 A1* | 2/2022 | Wang | ..................... | H04L 12/185 |
| 2022/0141647 A1* | 5/2022 | Castellanos Zamora | ..................... | |
| | | | | H04W 8/186 |
| | | | | 455/418 |
| 2023/0057651 A1* | 2/2023 | Kuravangi-Thammaiah | ............... | |
| | | | | H04M 15/66 |
| 2023/0188329 A1* | 6/2023 | Yeo | ..................... | G06F 21/6218 |
| | | | | 713/193 |
| 2023/0217241 A1* | 7/2023 | Velev | ..................... | H04W 8/20 |
| | | | | 455/414.1 |

OTHER PUBLICATIONS

3GPP TS 29.503 V17.5.0; 3rd Generation Partnership Project; Technical Specification Group Core Network and Terminals; 5G System; Unified Data Management Services; Stage 3 (Release 17); Dec. 2021, consisting of 466 pages.

3GPP TS 29.505 V17.5.0; 3rd Generation Partnership Project; Technical Specification Group Core Network and Terminals; 5G System; Usage of the Unified Data Repository Services for Subscription Data; Stage 3 (Release 17); Dec. 2021, consisting of 239 pages.

3GPP TS 29.503 V17.8.0; 3rd Generation Partnership Project; Technical Specification Group Core Network and Terminals; 5G System; Unified Data Management Services; Stage 3 (Release 17); Sep. 2022, consisting of 519 pages.

3GPP TS 29.505 V17.8.0; 3rd Generation Partnership Project; Technical Specification Group Core Network and Terminals; 5G System; Usage of the Unified Data Repository Services for Subscription Data; Stage 3 (Release 17); Sep. 2022, consisting of 265 pages.

EPO Communication—Intention to Grant dated May 9, 2025 for Patent Application No. 23701152.3, consisting of 8 pages.

* cited by examiner

*FIG. 4C*

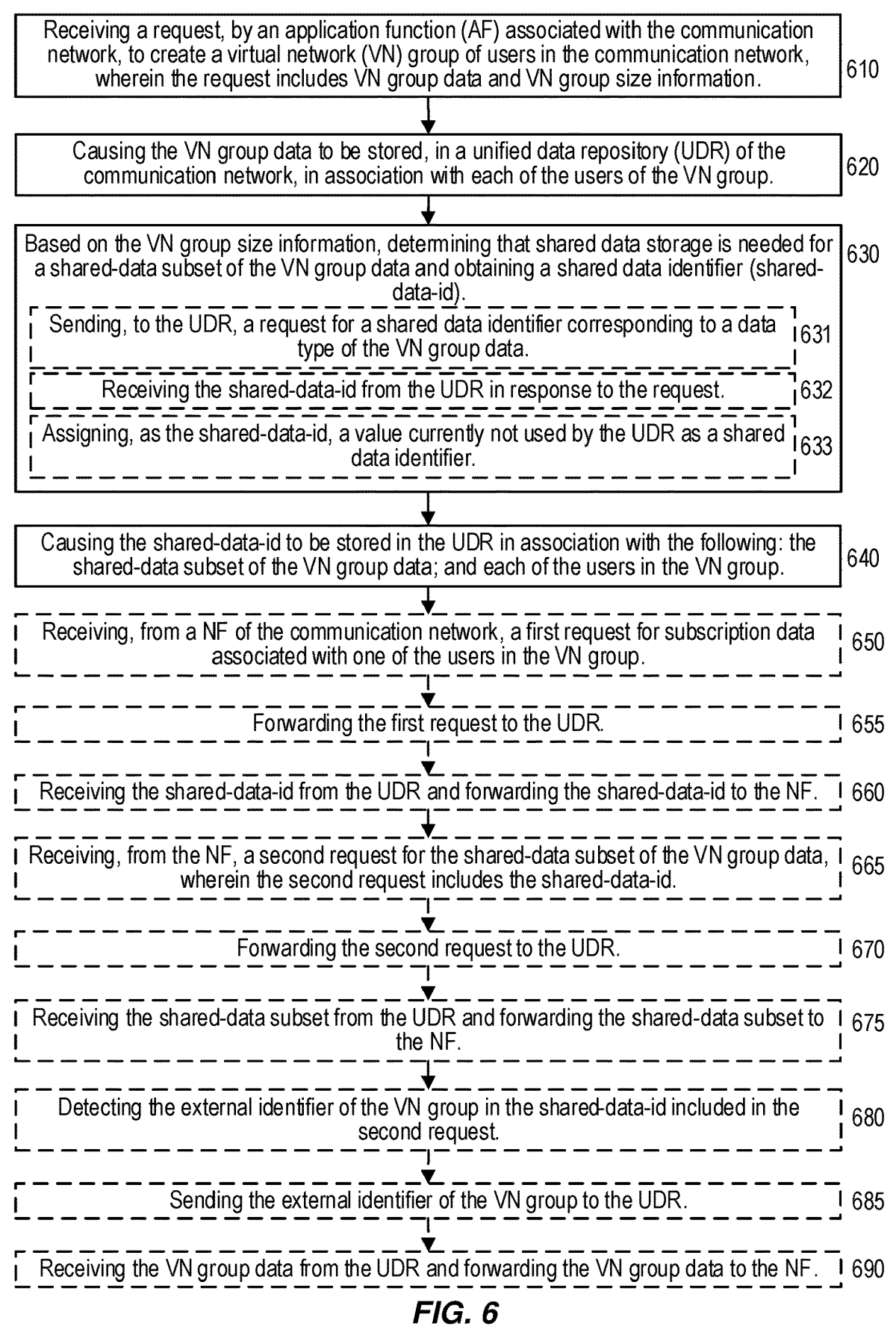

Receiving a request, by an application function (AF) associated with the communication network, to create a virtual network (VN) group of users in the communication network, wherein the request includes VN group data and VN group size information. ⎤610

Causing the VN group data to be stored, in a unified data repository (UDR) of the communication network, in association with each of the users of the VN group. ⎤620

Based on the VN group size information, determining that shared data storage is needed for a shared-data subset of the VN group data and obtaining a shared data identifier (shared-data-id). ⎤630

Sending, to the UDR, a request for a shared data identifier corresponding to a data type of the VN group data. ⎤631

Receiving the shared-data-id from the UDR in response to the request. ⎤632

Assigning, as the shared-data-id, a value currently not used by the UDR as a shared data identifier. ⎤633

Causing the shared-data-id to be stored in the UDR in association with the following: the shared-data subset of the VN group data; and each of the users in the VN group. ⎤640

Receiving, from a NF of the communication network, a first request for subscription data associated with one of the users in the VN group. ⎤650

Forwarding the first request to the UDR. ⎤655

Receiving the shared-data-id from the UDR and forwarding the shared-data-id to the NF. ⎤660

Receiving, from the NF, a second request for the shared-data subset of the VN group data, wherein the second request includes the shared-data-id. ⎤665

Forwarding the second request to the UDR. ⎤670

Receiving the shared-data subset from the UDR and forwarding the shared-data subset to the NF. ⎤675

Detecting the external identifier of the VN group in the shared-data-id included in the second request. ⎤680

Sending the external identifier of the VN group to the UDR. ⎤685

Receiving the VN group data from the UDR and forwarding the VN group data to the NF. ⎤690

*FIG. 6*

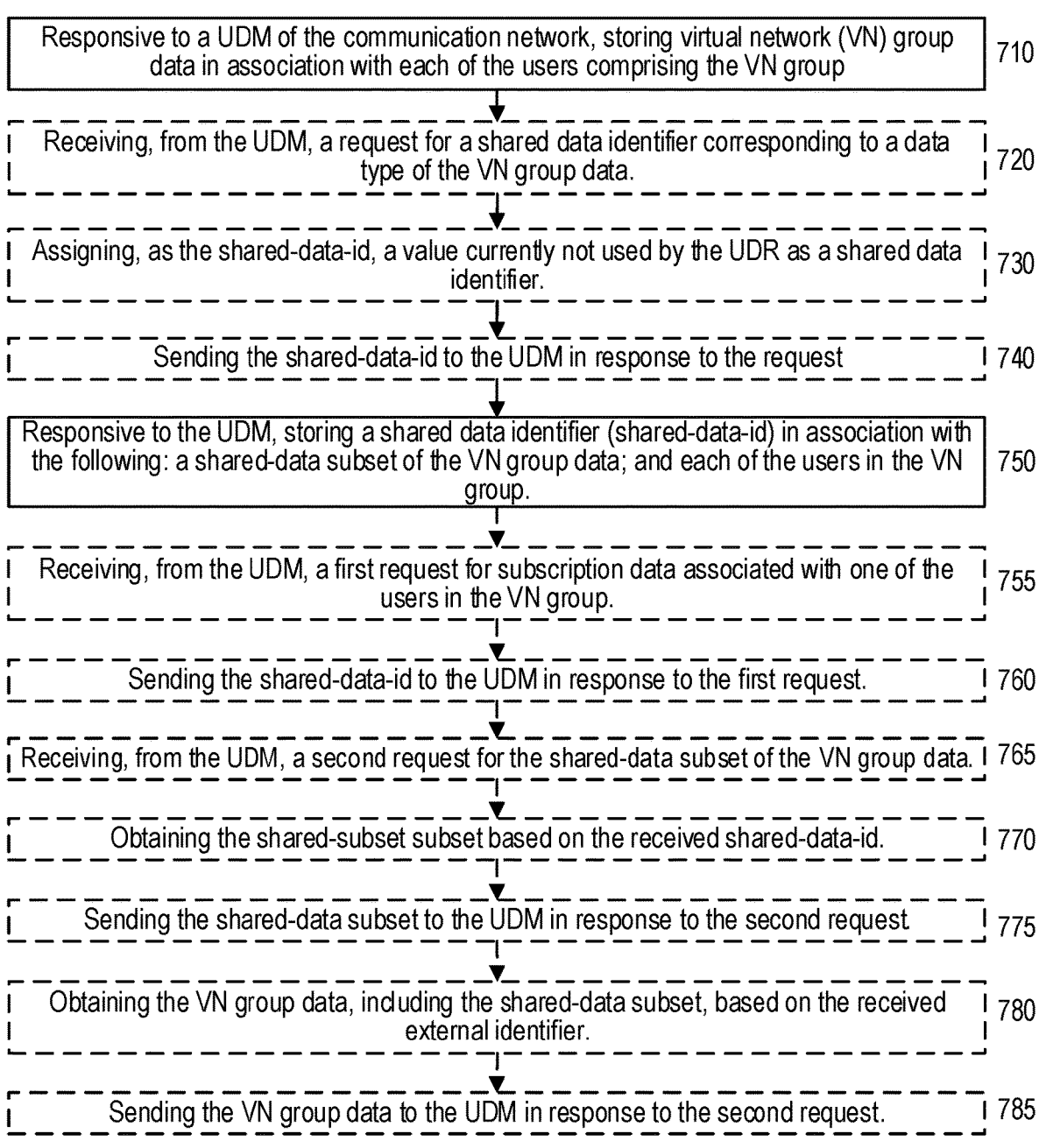

Responsive to a UDM of the communication network, storing virtual network (VN) group data in association with each of the users comprising the VN group    710

Receiving, from the UDM, a request for a shared data identifier corresponding to a data type of the VN group data.    720

Assigning, as the shared-data-id, a value currently not used by the UDR as a shared data identifier.    730

Sending the shared-data-id to the UDM in response to the request    740

Responsive to the UDM, storing a shared data identifier (shared-data-id) in association with the following: a shared-data subset of the VN group data; and each of the users in the VN group.    750

Receiving, from the UDM, a first request for subscription data associated with one of the users in the VN group.    755

Sending the shared-data-id to the UDM in response to the first request.    760

Receiving, from the UDM, a second request for the shared-data subset of the VN group data.    765

Obtaining the shared-subset subset based on the received shared-data-id.    770

Sending the shared-data subset to the UDM in response to the second request    775

Obtaining the VN group data, including the shared-data subset, based on the received external identifier.    780

Sending the VN group data to the UDM in response to the second request.    785

*FIG. 7*

Sending, to a unified data management function (UDM) of the communication network, a request to create a virtual network (VN) group of users in the communication network, wherein the request includes VN group data and VN group size information.    810

*FIG. 8*

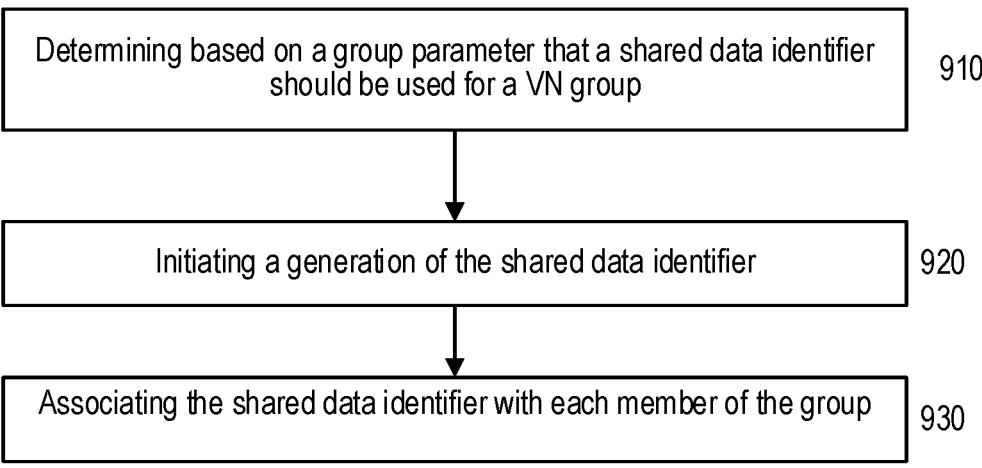

| | |
|---|---|
| Determining based on a group parameter that a shared data identifier should be used for a VN group | 910 |
| Initiating a generation of the shared data identifier | 920 |
| Associating the shared data identifier with each member of the group | 930 |

Fig. 15

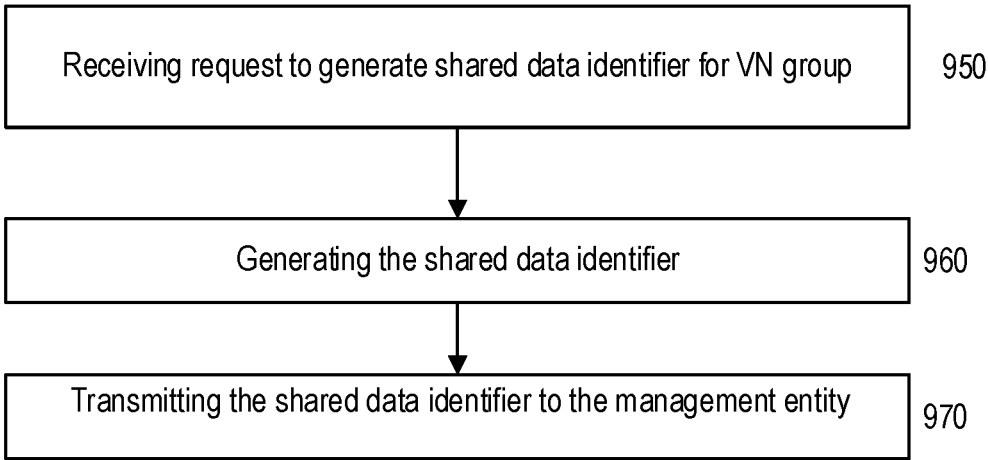

| | |
|---|---|
| Receiving request to generate shared data identifier for VN group | 950 |
| Generating the shared data identifier | 960 |
| Transmitting the shared data identifier to the management entity | 970 |

Fig. 16

VIRTUAL NETWORK (VN) GROUP AUTOMATION FOR DYNAMIC SHARED DATA IN 5G CORE NETWORK (5GC)

CROSS-REFERENCE TO RELATED APPLICATIONS

This application is a Submission Under 35 U.S.C. § 371 for U.S. National Stage Patent Application of International Application No.: PCT/EP2023/051382, filed Jan. 20, 2023 entitled "VIRTUAL NETWORK (VN) GROUP AUTOMA-TION FOR DYNAMIC SHARED DATA IN 5G CORE NETWORK (5GC)," which claims priority to European Application No.: 22382057.2, filed Jan. 26, 2022, entitled "VIRTUAL NETWORK (VN) GROUP AUTOMATION FOR DYNAMIC SHARED DATA IN 5G CORE NET-WORK (5GC)," the entireties of both of which are incor-porated herein by reference.

TECHNICAL FIELD

The present application relates generally to the field of communication networks, and more specifically to tech-niques for automatic creation and management of groups of nodes (such as user equipment) that form a virtual network (VN) within a 5G core network (5GC), particularly with respect to shared data among group members. The applica-tion relates more specifically to a method carried out at a management entity configured to manage subscriber data, to the corresponding management entity, to a method carried out at a subscriber data repository and the corresponding subscriber data repository. Furthermore, a system compris-ing the management entity and the data repository is pro-vided, a computer program comprising program code, and a carrier comprising the computer program.

BACKGROUND

At a high level, the 5G System (5GS) comprises an Access Network (AN) and a Core Network (CN). The AN provides UEs connectivity to the CN, e.g., via base stations such as gNBs or ng-eNBs described below. The CN includes a variety of Network Functions (NF) that provide a wide range of different functionalities such as session manage-ment, connection management, charging, authentication, etc.

FIG. 1 illustrates a high-level view of an exemplary 5G network architecture, comprising a Next Generation Radio Access Network (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respec-tively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U 25 interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support fre-quency division duplexing (FDD), time division duplexing (TDD), or a combination thereof. Each of the gNBs can serve a geographic coverage area including one or more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL pro-vides services for user plane transport and signaling trans-port. In some exemplary configurations, each gNB is con-nected to all 5GC nodes within an "AMF Region" with the term "AMF" referring to an access and mobility manage-ment function in the 5GC.

The NG RAN logical nodes shown in FIG. 1 include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Another change in 5G networks (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained function-alities that can be changed and modified in an isolated manner without affecting other services.

Furthermore, the services are composed of various "ser-vice operations", which are more granular divisions of the overall service functionality. The interactions between ser-vice consumers and producers can be of the type "request/response" or "subscribe/notify". In the 5G SBA, network repository functions (NRF) allow every network function to discover the services offered by other network functions, and Data Storage Functions (DSF) allow every network function to store its context. This 5G SBA model is based on principles including modularity, reusability and self-con-tainment of NFs, which can enable network deployments to take advantage of the latest virtualization and software technologies.

An Application Function (AF) is a type of 5GC NF that is of particular interest in the present disclosure. An AF interacts with the 5GC to provision information to the network operator and to subscribe to certain events happen-ing in operator's network. An AF offers applications for which service is delivered in a different layer (i.e., transport layer) than the one in which the service has been requested (i.e., signaling layer), the control of flow resources according to what has been negotiated with the network.

3GPP TS 29.503 (v17.5.0) describes a "shared data identifier" used in 5GC to optimize memory (or storage) footprint, signaling, and computing across different NFs. For example, the shared data identifier and other shared data mechanisms can be used for creation and management of a 5G Virtual Network (VN) group of UEs. 5G VN is a local-area network (LAN) type of service in which group membership can be configured by a network operator or can be managed dynamically by third party applications, such as an AF.

When a 5G VN group is created, it is expected that group members (i.e., UEs) share the same data (also referred to as "group data" or "shared data"). Instead of an individual provisioning of group data, a profile identifier (called "shared-data-id") is provisioned to every UE in the group. This identifier is also associated with the common profile/shared data (e.g., 5G VN group data configured by an AF). In this manner, the various group members are associated with the group data based on the received shared-data-id, which can reduce provisioning effort particularly when the number of group members is large.

SUMMARY

In general, any authorized AF can create a 5G VN group of UEs for private communication. This procedure is highly automated. However, the corresponding procedures for assigning a shared-data-id and provisioning this information to all group members are not automated, which places significant administrative burden on the network operator. This can cause various problems, issues, and/or difficulties.

Embodiments of the present disclosure address these and other problems, issues, and/or difficulties, thereby facilitating the automated deployment of 5G VN groups having shared data.

Some embodiments include exemplary methods (e.g., procedures) for a unified data management function (UDM) also called management entity hereinafter of a communication network also called cellular network (e.g., 5GC) hereinafter.

The problems above are solved by the features of the independent claims. Further aspects are described by the dependent claims.

According to a first aspect a method is provided carried out by a management entity configured to manage subscriber data of a plurality of subscribers in a cellular network, the method comprising the steps of determining, based at least one group parameter, that a shared data identifier should be used for a virtual network group of subscribers, wherein members of the group of subscribers are among the plurality of subscribers and share at least one common parameter identified by the shared data identifier. Additionally, a generation of the shared data identifier to be used for the group of subscribers is initiated and the shared data identifier is associated with each member of the group of subscribers.

Furthermore, the corresponding management entity is provided comprising a memory and at least one processing unit, wherein the memory contains instructions executable by the at least one processing unit, wherein the management entity is configured to operate as discussed above or discussed in more detail below.

In addition, a method carried out at a subscriber data repository for a plurality of subscribers of a cellular network is provided, the method comprising the step of receiving, from a management entity configured to manage subscriber data, a request to generate a shared data identifier to be used for a virtual network group of subscribers, wherein members of the group of subscribers are among the plurality of subscribers and share at least one common parameter identified by the shared data identifier. The shared data identifier to be used for the group of subscribers is generated such that the shared data identifier contains an indicator including a first portion with a group identifier used for identifying the virtual network group, the indicator including a second portion indicating that the shared data identifier has been automatically generated by an application function in the cellular network. The shared data identifier is transmitted with the indicator to the management entity.

Additionally, the corresponding subscriber data repository is provided comprising a memory and at least one processing unit, wherein the memory contains instructions executable by the at least one processing unit, wherein the subscriber data repository is configured to operate as discussed above or discussed in more detail below.

The application relates to a system comprising the management entity and the subscriber data repository, to a computer program comprising program code to be executed by at least one processing unit of a management entity configured to manage subscriber data of a plurality of subscribers or of a subscriber data repository, wherein execution of the program code causes the at least one processing unit to carry out a method as mentioned above or as discussed in more detail below.

The application additionally provides a carrier comprising the computer program mentioned above, wherein the carrier is one of an electronic signal, optical signal, radio signal, and computer readable storage medium.

These exemplary methods can include receiving a request, by an AF associated with the communication network, to create a VN group of users in the communication network, wherein the request includes VN group data and VN group size information. For example, the request can be received from the AF via a network exposure function (NEF) of the communication network.

These exemplary methods can also include causing the VN group data to be stored, in a UDR (Unified Data Repository) also called subscriber data repository hereinafter, of the communication network, in association with each of the users of the VN group. These exemplary methods can also include, based on the VN group size information, determining that shared data storage is needed for a shared-data subset of the VN group data and obtain a shared data identifier (shared-data-id). These exemplary methods can also include causing the shared-data-id to be stored in the UDR in association with the following: the shared-data subset of the VN group data; and each of the users in the VN group.

In some embodiments, the VN group size information includes one or more of the following: an actual or expected number of users comprising the VN group, and a growth rate for number of users comprising the VN group. In some embodiments, the shared-data subset of the VN group data includes network slice selection assistance information (NSSAI) and/or a data network name (DNN). In such case, the VN group data includes the shared-data subset and one or more of the following: a list of the users in the VN group, and an external identifier of the VN group.

In some embodiments, obtaining the shared-data-id can include sending, to the UDR, a request for a shared data identifier corresponding to a data type of the VN group data and receiving the shared-data-id from the UDR in response to the request. In other embodiments, obtaining the shareddata-id can include assigning, as the shared-data-id, a value currently not used by the UDR as a shared data identifier.

In some embodiments, these exemplary methods can also include the following operations: receiving, from a network function (NF) of the communication network, a first request for subscription data associated with one of the users in the VN group; forwarding the first request to the UDR; receiving the shared-data-id from the UDR; forwarding the shared-data-id to the NF; and receiving, from the NF, a second request for the shared-data subset of the VN group data, wherein the second request includes the shared-data-id.

In some of these embodiments, the UDM causes the shared-data-id to be stored, in association with the shared-data subset, separately from the VN group data stored in association with each of the users of the VN group. Furthermore, these exemplary methods also includes forwarding the second request to the UDR, receiving the shared-data subset from the UDR, and forwarding the shared-data subset to the NF.

In other of these embodiments, the shared-data-id includes a first portion comprising a unique value auto-generated by the UDM or by the UDR and a second portion comprising an external identifier of the VN group. For example, the unique value auto-generated by the UDM or by the UDR can be or include a token or a magic cookie. As another example, the first and second portions can be concatenated to form a single unique identifier.

In such embodiments, the VN group data stored in association with each of the users of the VN group can include the external identifier of the VN group. In such case, these exemplary methods also include detecting the external identifier of the VN group in the shared-data-id included in the second request, sending the external identifier of the VN group to the UDR, receiving the VN group data from the UDR, and forwarding the VN group data to the NF.

In some of these embodiments, the NF can be an access and mobility management function (AMF). In other of these embodiments, the NF can be a session management function (SMF).

Other embodiments include methods (e.g., procedures) for a unified data repository (UDR) of a communication network (e.g., 5GC).

These exemplary methods can include, responsive to a UDM of the communication network, storing VN group data in association with each of the users comprising the VN group. These exemplary methods can also include, responsive to the UDM, storing a shared data identifier (shared-data-id) in association with the following: a shared-data subset of the VN group data; and each of the users in the VN group.

In some embodiments, the shared-data subset of the VN group data includes network slice selection assistance information (NSSAI) and/or a data network name (DNN). In such case, the VN group data includes the shared-data subset and one or more of the following: a list of the users in the VN group, and an external identifier of the VN group.

In some embodiments, these exemplary methods can also include the following operations: receiving, from the UDM, a request for a shared data identifier corresponding to a data type of the VN group data; assigning, as the shared-data-id, a value currently not used by the UDR as a shared data identifier; and sending the shared-data-id to the UDM in response to the request.

In some embodiments, these exemplary methods can also include the following operations: receiving, from the UDM, a first request for subscription data associated with one of the users in the VN group; sending the shared-data-id to the UDM in response to the first request; and receiving, from the UDM, a second request for the shared-data subset of the VN group data.

In some of these embodiments, the shared-data-id is stored, in association with the shared-data subset, separately from the VN group data stored in association with each of the users of the VN group. Additionally, the second request includes the shared-data-id. In such embodiments, these exemplary methods can also include obtaining the shared-subset subset (e.g., from storage) based on the received shared-data-id and sending the shared-data subset to the UDM in response to the second request.

In other of these embodiments, the shared-data-id includes a first portion comprising a unique value auto-generated by the UDM or by the UDR and a second portion comprising an external identifier of the VN group. For example, the unique value auto-generated by the UDM or by the UDR can be or include a token or a magic cookie. As another example, the first and second portions can be concatenated to form a single unique identifier.

In such embodiments, the VN group data stored in association with each of the users of the VN group can include the external identifier of the VN group. Also, the second request includes the external identifier of the VN group. In such case, these exemplary methods can also include obtaining the VN group data, including the shared-data subset, based on the received external identifier and sending the VN group data to the UDM in response to the second request.

Other embodiments include methods (e.g., procedures) for an AF associated with a communication network (e.g., 5GC).

These exemplary methods can include sending, to a UDM of the communication network, a request to create a VN group of users in the communication network. The request includes VN group data and VN group size information. In some embodiments, the request can be sent to the UDM via an NEF of the communication network.

In some embodiments, the VN group size information includes one or more of the following: an actual or expected number of users comprising the VN group, and a growth rate for number of users comprising the VN group. In some embodiments, the VN group data includes the following:

a shared-data subset, including one or more of the following: network slice selection assistance information (NSSAI), and data network name (DNN); and one or more of the following: a list of the users in the VN group, and an external identifier of the VN group.

Other embodiments include UDMs, UDRs, and AFs that are configured to perform the operations corresponding to any of the exemplary methods described herein. Other embodiments also include non-transitory, computer-readable media storing computer-executable instructions that, when executed by processing circuitry associated with such UDMs, UDRs, and AFs, configure the same to perform operations corresponding to any of the exemplary methods described herein.

These and other disclosed embodiments can provide automated procedures for a UDM to orchestrate and/or control the provisioning and configuration of shared data for dynamic 5G VN groups, thereby avoiding administrative burden that manual provisioning and configuration places on a mobile network operator (MNO). Reducing administrative burdens in this manner can reduce operating expenses for the MNO. By having the expected 5G VN group size and/or growth, embodiments enable the MNO to better optimize 5GC resources (e.g., storage, computing, signaling, etc.) in support of the 5G VN group, which can lead to service level agreements (SLAs) with better pricing for the application provider relative to when the MNO is unaware of such information.

These and other objects, features, and advantages of the present disclosure will become apparent upon reading the following Detailed Description in view of the Drawings briefly described below.

BRIEF DESCRIPTION OF THE DRAWINGS

FIG. 3, which includes

FIG. 4, which includes FIGS. 4A-C, shows an exemplary procedure for configuring and provisioning shared data and an associated identifier (shared-data-id) for a 5G VN group, according to various embodiments of the present disclosure.

FIG. 5, which includes

FIG. 6 shows an exemplary method (e.g., procedure) for a unified data management function (UDM) of a communication network (e.g., 5GC), according to various embodiments of the present disclosure.

FIG. 7 shows an exemplary method (e.g., procedure) for unified data repository (UDR) of a communication network (e.g., 5GC), according to various embodiments of the present disclosure.

FIG. 8 shows an exemplary method (e.g., procedure) for an application function (AF) associated with a communication network (e.g., 5GC), according to various embodiments of the present disclosure.

FIG. 15 shows an exemplary method carried out at the management entity of the communication network.

FIG. 16 shows an exemplary method carried out at the subscriber data repository of the communication network.

DETAILED DESCRIPTION

Figure 1:
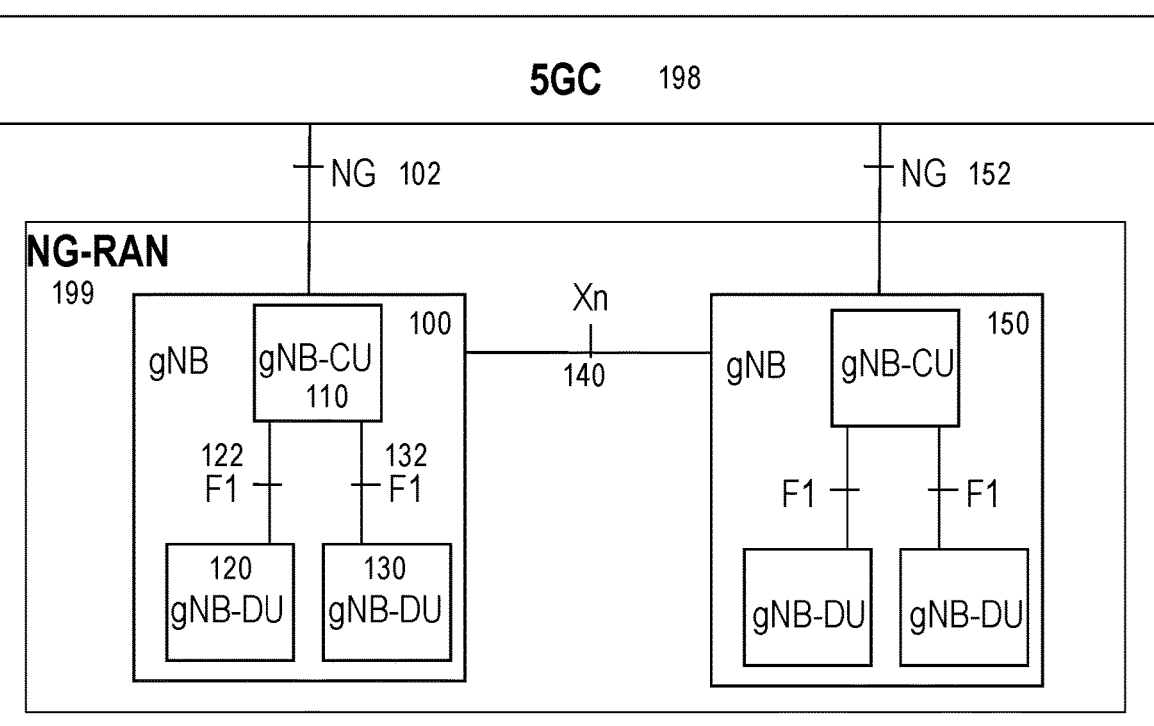
FIGS. 1-2 illustrate various aspects of an exemplary 5G network architecture.

Embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Network Node: As used herein, a "network node" is any node that is part of the core network (e.g., a core network node discussed above) of a telecommunications network. Functionally, a network node is equipment capable, configured, arranged, and/or operable to communicate directly or indirectly with a wireless or wired device and/or with other network nodes or equipment in the telecommunications network, to enable and/or provide wireless or wired access to the telecommunication device, and/or to perform other functions (e.g., administration) in the telecommunications network.

Node: As used herein, the term "node" (without any prefix) can be any type of node that is capable of operating in or with a telecommunication network (including a RAN and/or a core network), including a radio access node (or equivalent term), core network node, or telecommunications device.

Service: As used herein, the term "service" refers generally to a set of data, associated with one or more applications, which is to be transferred via a network with certain specific delivery requirements that need to be fulfilled in order to make the applications successful.

Component: As used herein, the term "component" refers generally to any component needed for the delivery of a service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", which is an entity that can collect historical information about utilization of resources as well as provide information about the current and the predicted future availability of resources associated with that component (e.g., a RAN manager).

Note that the description given herein focuses on a 3GPP telecommunications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a telecommunications device or a network node may be distributed over a plurality of telecommunications devices and/or network nodes.

Figure 2:
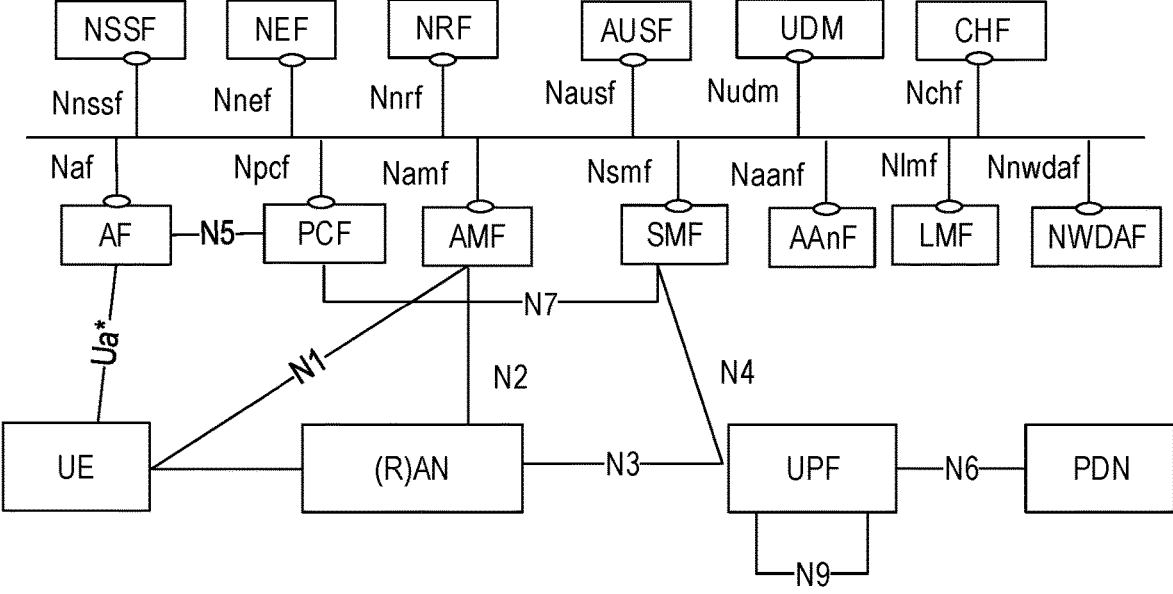

FIG. 2 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)-supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface-acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.

Network Repository Function (NRF) with Nnrf interface-provides service registration and discovery, enabling NFs to identify appropriate services available from other NFs.

Network Slice Selection Function (NSSF) with Nnssf interface-a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface-based in a user's home network (HPLMN), it performs user authentication and computes security key materials for various purposes.

Network Data Analytics Function (NWDAF) with Nnwdaf interface, described in more detail above and below.

Location Management Function (LMF) with Nlmf interface-supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF. The terms "UDM" and "UDM function" are used interchangeably herein.

The NRF allows every NF to discover the services offered by other NFs, and Data Storage Functions (DSF) allow every NF to store its context. In addition, the NEF provides exposure of capabilities and events of the 5GC to AFs within and outside of the 5GC. For example, NEF provides a service that allows an AF to provision specific subscription data (e.g., expected UE behavior) for various UEs.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol (N1 interface in FIG. 2). Security for the communications over this these strata is provided by the NAS protocol (for NAS) and the PDCP protocol (for AS). 3GPP TS 29.503 (v17.5.0) describes a "shared data identifier" used in 5GC to optimize memory (or storage) footprint, signaling, and computing across different NFs. For example, the shared data identifier and other shared data mechanisms can be used for creation and management of a 5G Virtual Network (VN) group of UEs. 5G VN is a local-area network (LAN) type of service in which group membership can be configured by a network operator or can be managed dynamically by third party applications, such as an AF.

When a 5G VN group is created, it is expected that group members (i.e., UEs) share the same data (also referred to as "group data" or "shared data"). Instead of an individual provisioning of group data, a profile identifier (called "shared-data-id") is provisioned to every UE in the group. This identifier is also associated with the common profile/shared data (e.g., 5G VN group data configured by an AF). In this manner, the various group members are associated with the group data based on the received shared-data-id, which can reduce provisioning effort particularly when the number of group members is large.

Figure 3A:
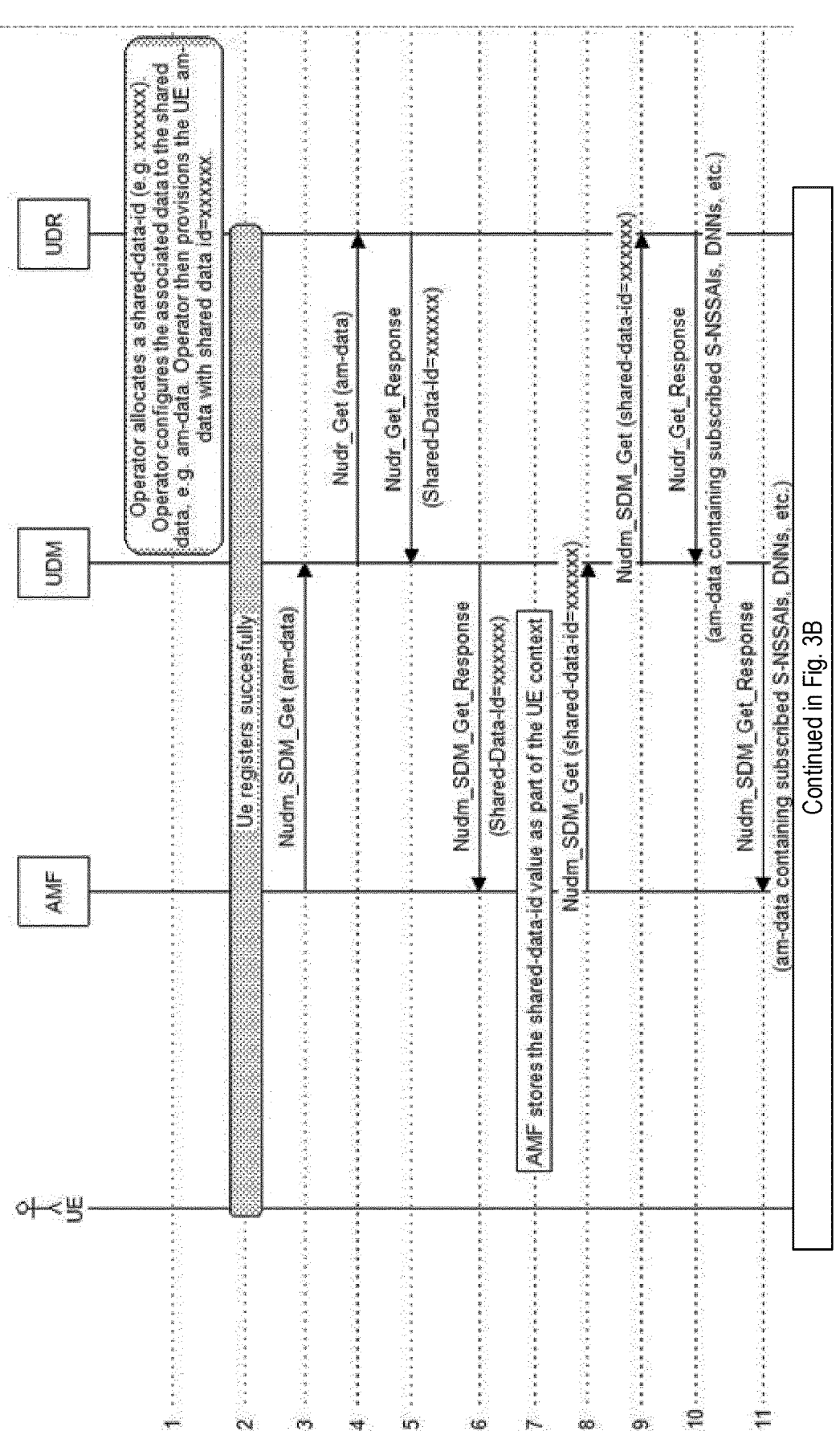
FIGS. 3A-B, shows a conventional procedure for configuring and provisioning shared data and an associated identifier (shared-data-id) in a 5GC.
Figure 3B:
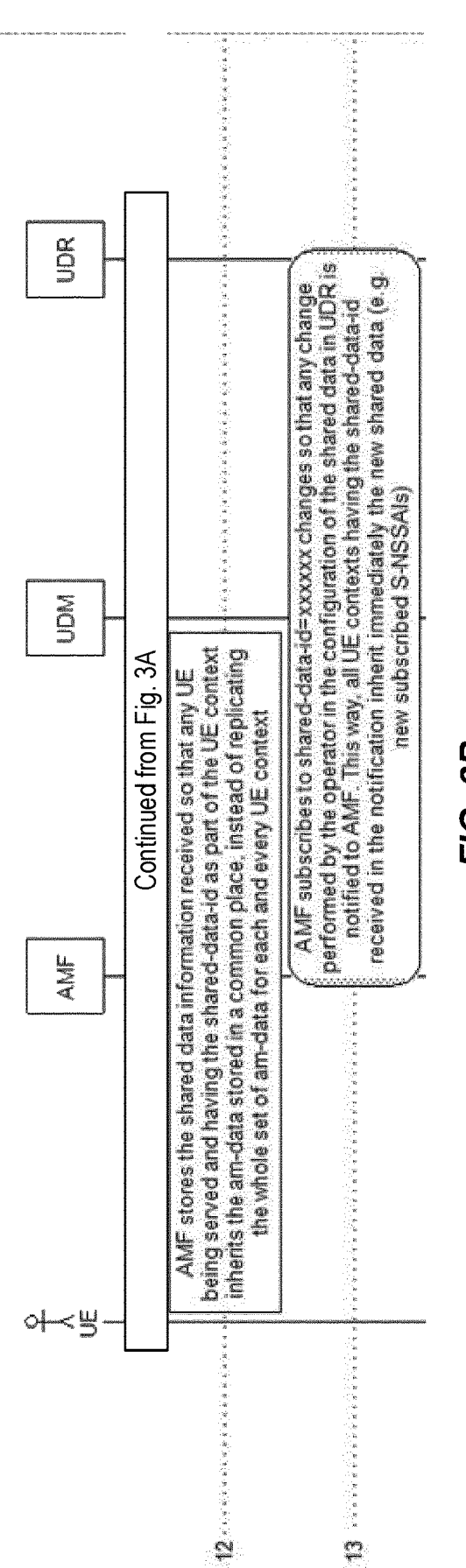

FIG. 3, which includes FIGS. 3A-B, shows a conventional procedure for configuring and provisioning shared data and an associated identifier (shared-data-id) in a 5GC. The procedure shown in FIG. 3 is between a UE, an AMF, a UDM, and a UDR.

In operation 1, the mobile network operator (MNO) allocates a shared-data-id and configures the shared data (e.g., am-data) associated with the shared-data-id in the UDR. The MNO then provisions the am-data with the shared-data-id, e.g., upon successful UE registration in operation 2.

After successful registration of the UE with the network (operation 2), the AMF sends a request for am-data to UDM (operation 3), which forwards this request to UDR (operation 4). UDR responds with the previously configured shared-data-id (operation 5), which UDM forwards to AMF (operation 6). The AMF stores the shared-data-id as part of the UE's context (operation 7) and sends a request for the associated am-data to the UDM (operation 8), which forwards the request to the UDR (operation 9).

The UDR responds with the requested am-data (operation 10), which can include subscribed S-NSSAIs (single network slice selection assistance information), DNNs (data network names), etc. The UDM provides this information to the AMF (operation 11), which stores it (operation 12) in a place accessible for any served UE having shared-data-id as part of its UE context-instead of storing the am-data replicated in every UE context. In operation 13, the AMF subscribes to updates for shared-data-id so that it receives notification of any operator changes to the associated am-data (e.g., new S-NSSAIs).

The interactions between UDM and AMF regarding shared data in FIG. 3 (e.g., operations 3-11) are only exemplary. As another example, similar interactions can occur between UDM and SMF regarding different shared data (e.g., sm-data).

As illustrated in FIG. 3, shared data (e.g., am-data) is predefined and/or preconfigured in advance by the MNO. Consider the example in which a large number of users have purchased the same data plan (e.g., 10 Gb per month) with the same Quality of Service (QOS). Instead of provisioning the same set of shared data per user, the operator simply creates a shared-data-id (e.g., "Data_Plan_10 Gb_Low_QoS") associated with the relevant parameter set (e.g., S-NSSAIs corresponding to the data plan and QoS) and then provisions the shared-data id "Data_Plan_10 Gb_Low_QoS" to each user.

In this manner, the MNO has to store the shared data (i.e., the parameter set) associated with "Data_Plan_10 Gb_Low_QoS" only once. Also, if the operator decides to upgrade the data plan to 15 Gb with no extra cost for the users, it simply updates the shared data and all users that were provisioned with "Data_Plan_10 Gb_Low_QoS" automatically inherit the new data, without any extra individual provisioning for each UE.

This arrangement is sufficient when the data plan is pre-defined by the operator and the user needs to contact the operator to purchase the data plan. However, any authorized application (i.e., AF) can create a 5G VN group of UEs for private communication. While this procedure is highly automated, the current procedures for assigning a shared-data-id and provisioning this information to all group members are not automated.

In the current procedures, after a 5G VN group is created dynamically by the AF, the MNO must perform various operations manually when it decides to use shared data. These action include allocating a shared-data-id, creating a shared data set containing the corresponding 5G VN group data, and provisioning the shared-data-id individually in the subscription data of UE that is a member of the 5G VN group. These operations place significant administrative burden on the MNO.

Accordingly, embodiments of the present disclosure address these and other problems, issues, and/or difficulties by providing automated procedures for the UDM to orchestrate and/or control the provisioning and configuration of shared data for dynamic 5G VN groups, thereby avoiding administrative burden that manual provisioning and configuration places on the MNO. For example, the AF can indicate the expected size and/or growth of a group to be created so that the 5GC can automatically orchestrate the usage of a common profile and/or shared data for all members at the time the 5G VN group is created.

Reducing administrative burdens in this manner can lead to reduced operating expenses (OPEX) for the MNO. By having the expected 5G VN group size and/or growth, embodiments enable the MNO to better optimize 5GC resources (e.g., storage, computing, signaling, etc.) in support of the 5G VN group, which can lead to service level agreements (SLAs) with better pricing for the application provider relative to when the MNO is unaware of such information. Embodiments also provide more efficient group data updates for large 5G VN groups.

Embodiments can be summarized as follows. The AF indicates to the UDM, as part of the 5G VN group data creation, the expected size of the group (e.g., UE members, Application Descriptors, etc.) based on the intended 5G VN group usage. Based on local policy, the UDM determines that it is necessary and/or beneficial to allocate shared data including 5G VN group data. After an automated shared data allocation (by UDM or by UDR), in different embodiments, the UDM stores the shared data as part of the 5G VN group and provisions the shared-data-id 25 for each group member added (or de-provisions the shared-data-id for each group member removed). In various embodiments, the UDM can either create a shared-data-id in UDR with the 5G VN group data or identify the shared-data-id as automatically generated for a 5G VN group, so that it can retrieve the 5G VN group data and avoid having duplication of data in UDR (e.g., 5G VN group data and shared data with a subset of 5G VN group data).

Figure 4A:
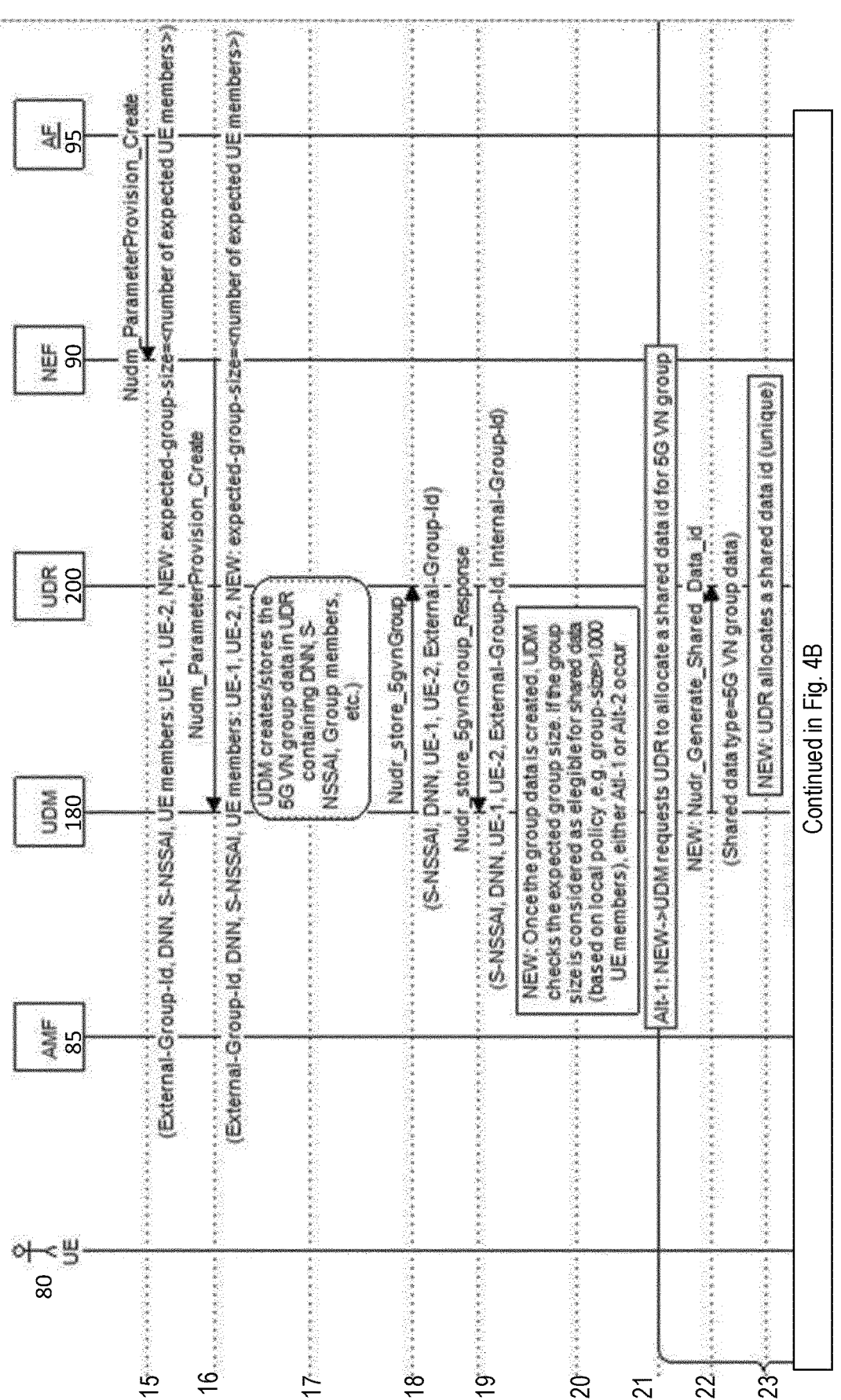
Figure 4B:
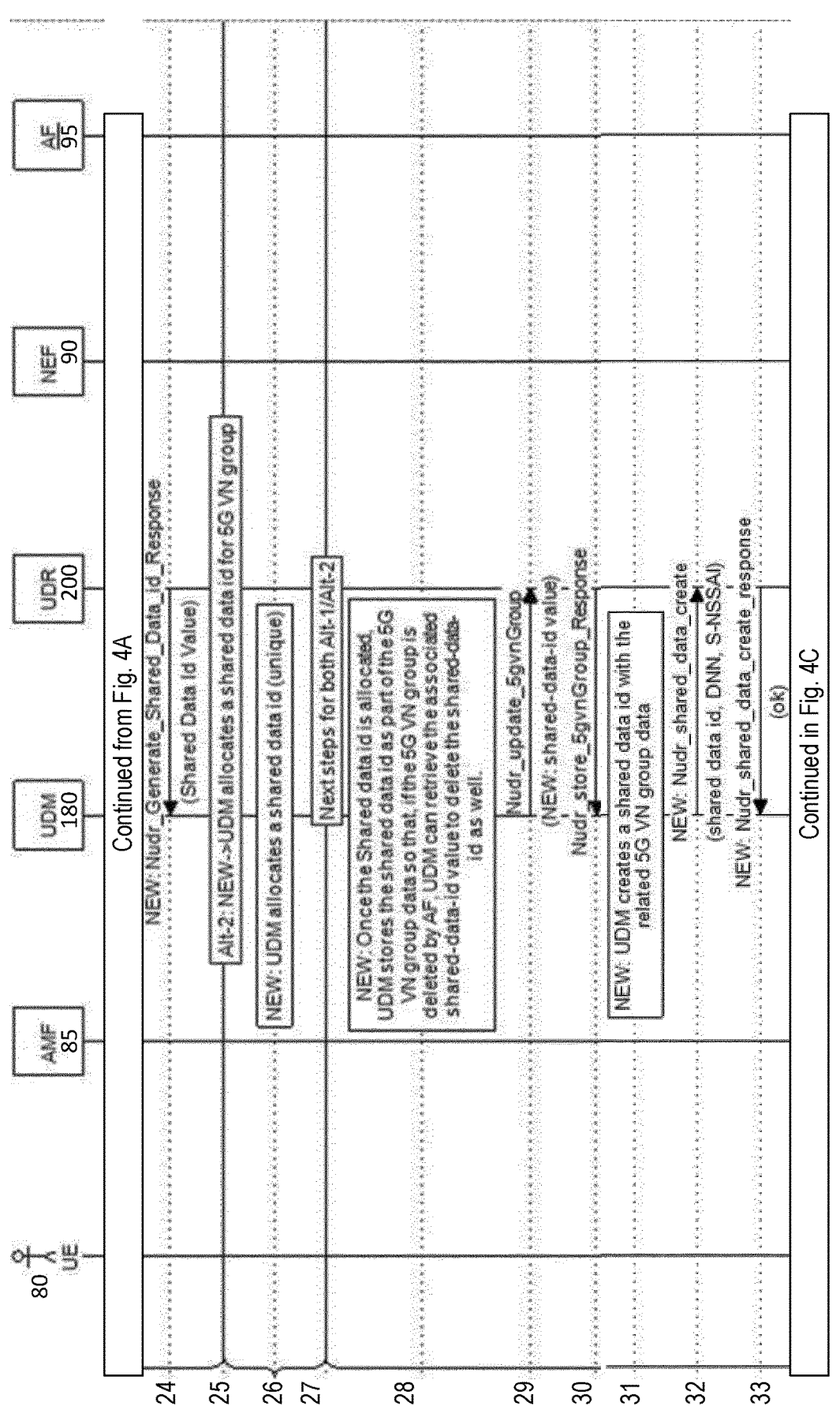
Figure 4C:
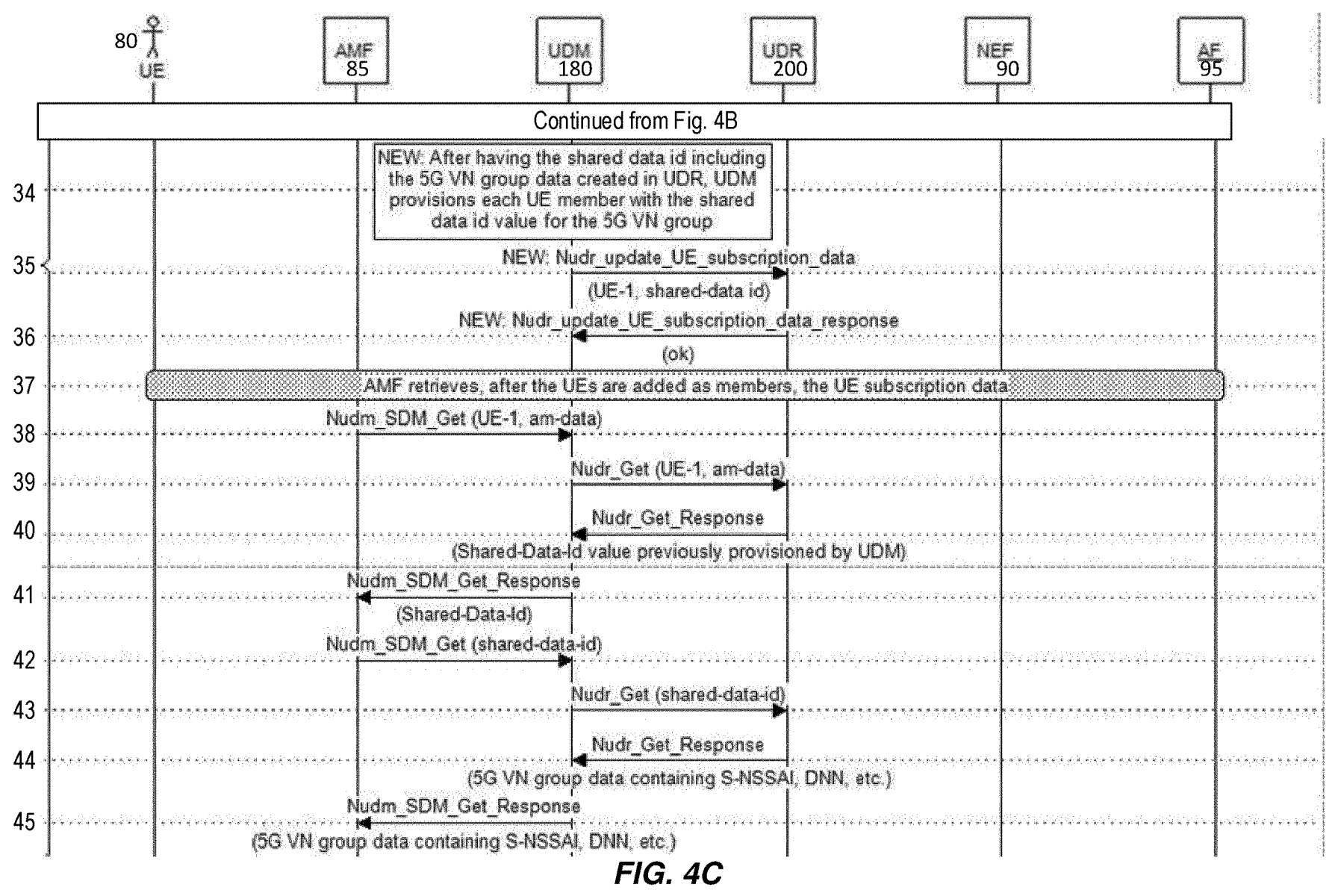

FIG. 4, which includes FIGS. 4A-C, shows an exemplary procedure for configuring and provisioning shared data and an associated identifier (shared-data-id) for a 5G VN group, according to various embodiments of the present disclosure. The procedure shown in FIG. 4 is between a UE 80, an AMF 85, a UDM 180, a UDR 200, an NEF 90, and an AF 95. Although the operations shown in FIG. 4 are given numerical labels, this is intended to facilitate explanation rather than to require or imply any particular operational order, unless expressly stated to the contrary. Note that the AMF is intended to be exemplary of various NFs (e.g., AMF, SMF, etc.) that can interact with the UDM in the manner shown in FIG. 4.

In operation 15, the AF 95 sends a message to the NEF for creation of a new 5G VN group. The message includes data associated with the 5G VN group such NSSAI, DNN, UE members, etc. The AF 95 also indicates the expected group size, e.g., actual or expected number of group members. In operation 16, the NEF 90 authenticates the request and checks that the AF is allowed to create 5G VN groups. If successful, the NEF 90 proxies the request, including the expected group size, to the UDM. In operations 17-19, the UDM creates the 5G VN group in the UDR 200, together with the associated data received from AF via NEF. In operation 20, based on local configuration according to MNO policy, the UDM 180 determines that shared data is preferred and/or required for the 5G VN group according to the expected group size.

Operation 21 represents subsequent operations 22-24, according to some embodiments. In operation 22, based on local policy or implementation, the UDM 180 requests the UDR to allocate a shared-data-id for the 5G VN group data (shared data type) using a new service operation such as Nudr Generate Shared Data id. In operations 23-24, the UDR 200 allocates a unique shared-data-id for the type of shared data requested and returns it to the UDM 180.

Operation 25 represents subsequent operation 26, according to other embodiments. In operation 26, the UDM 180 allocates a unique shared-data-id for the type of shared data requested. The UDM must ensure that the allocated value does not exist already in the UDR 200.

Operation 27 represents the following operations, which are applicable to both of the above-mentioned embodiments. In operations 28-30, the UDM 180 updates the 5G VN group data with a new attribute that contains the allocated shared-data-id associated with the 5G VN group shared data. This will be required later in case the AF 95 deletes the group, so that the UDM can also delete the shared-data-id and the associated shared data in UDR.

In operation 31-33, the UDM 180 creates in UDR 200 the shared data associated with the allocated shared-data-id, and stores the 5G VN group data required by the serving AMF/SMF. This shared data is a subset of the 5G VN group data sent by the AF and stored in operation 18, e.g., since the UE member list is not part of this shared data. As an example, the UDM 180 can use a new service operation such as Nudr shared data create for these operations.

In operations 34-36, the UDM 180 provisions to UDR 200 the shared-data-id for each UE member in the group. Based on this provisioning, each UE member can inherit the associated 5G VN group data (e.g., DNN, NSSAI, etc.). As an example, the UDM 180 can use a new service operation such as Nudr update UE subscription data for these operations. Operations 37-45 are substantially similar to operations 3-11 shown in FIG. 3A and described above.

Figure 5A:
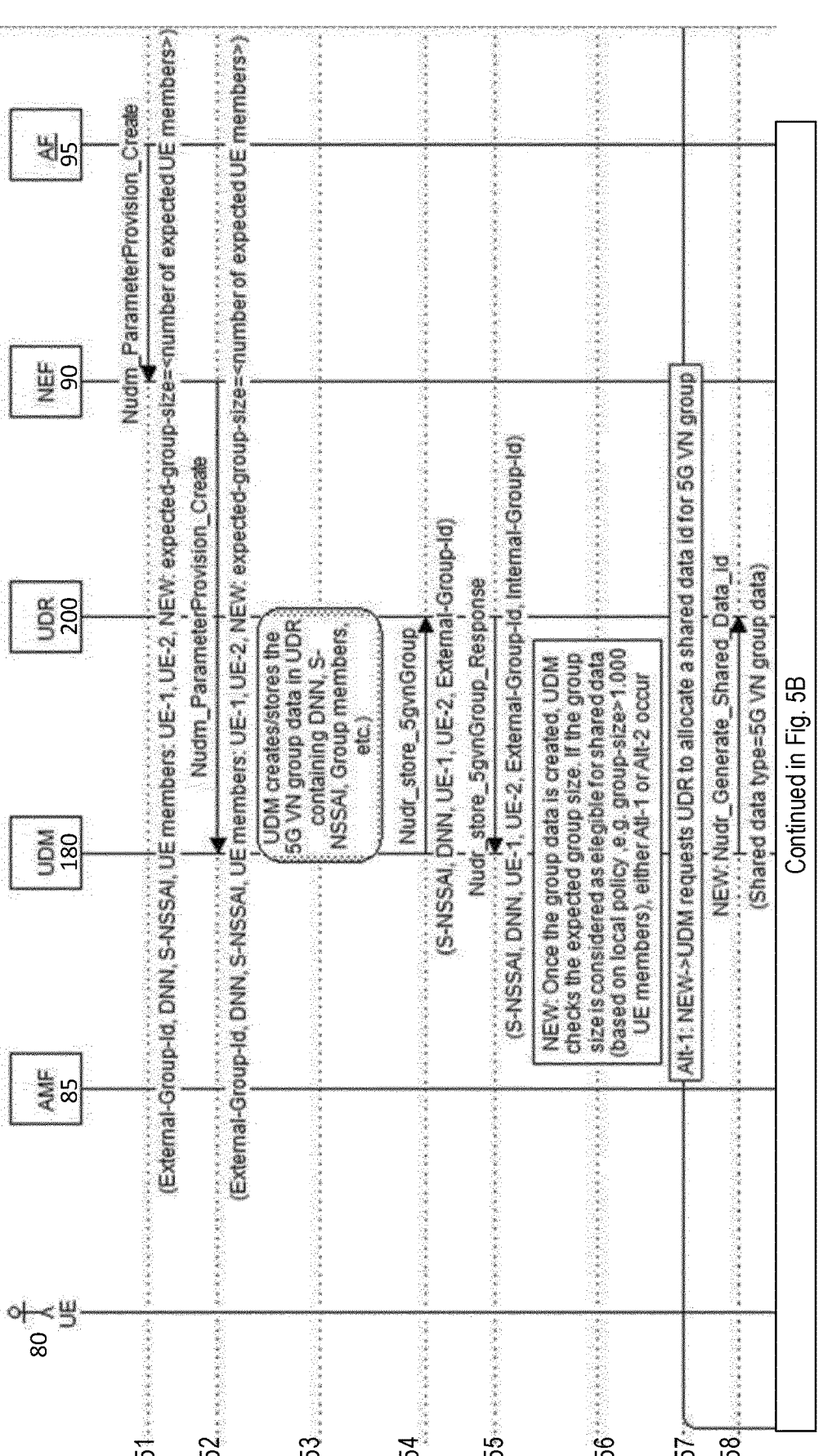
FIGS. 5A-C, shows another exemplary procedure for configuring and provisioning shared data and an associated identifier (shared-data-id) for a 5G VN group, according to various embodiments of the present disclosure.
Figure 5B:
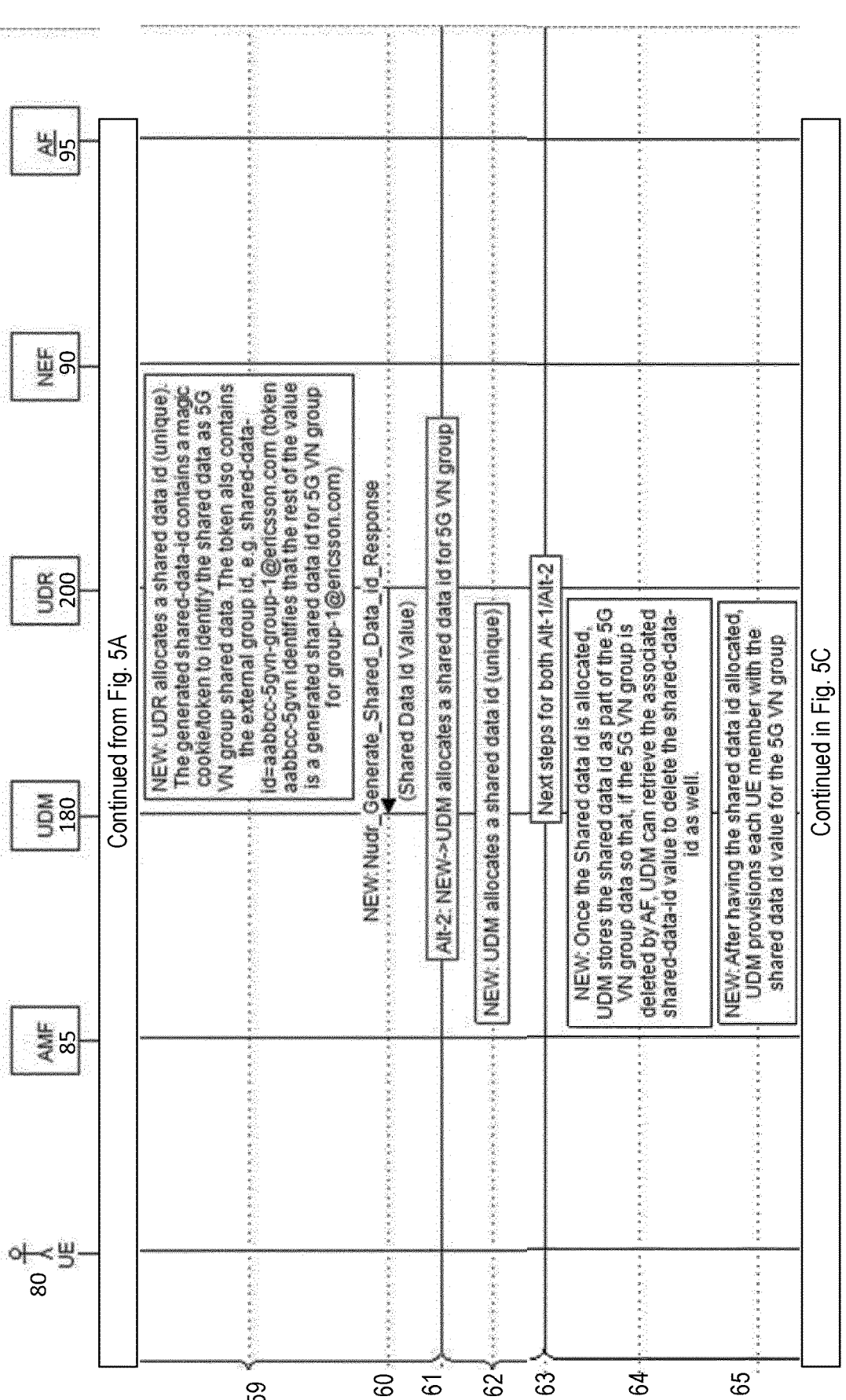
Figure 5C:
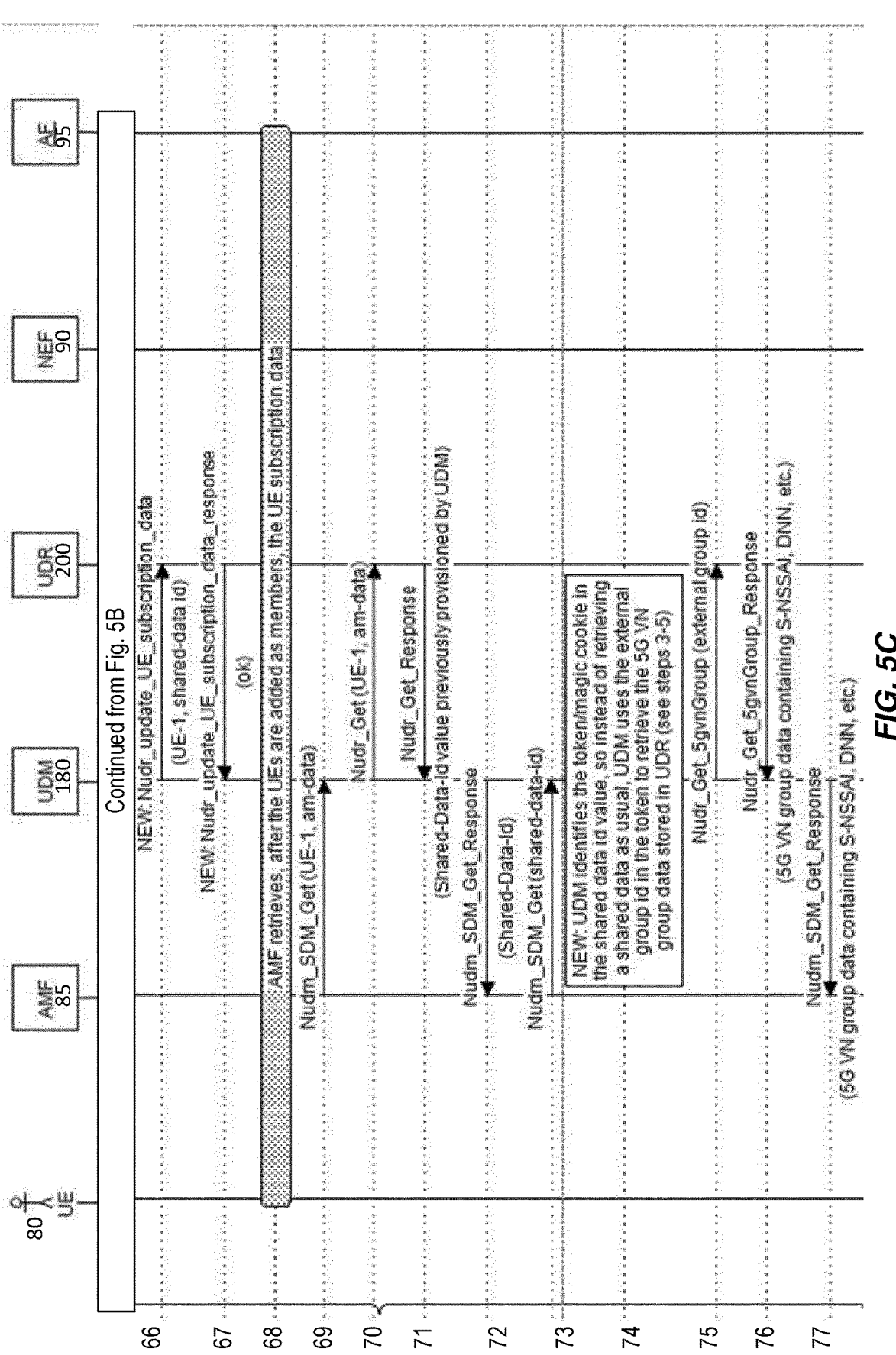

In other embodiments, the UDM 180 can reuse 5G VN group data instead of creating a new shared data resource which contains a subset of the 5G VN group data. FIG. 5, which includes FIGS. 5A-C, shows another exemplary procedure for configuring and provisioning shared data and an associated identifier (shared-data-id) for a 5G VN group, according to these embodiments. The procedure shown in FIG. 5 is between a UE 80, an AMF 85, a UDM 180, a UDR 200, an NEF 90, and an AF 95. Although the operations shown in FIG. 5 are given numerical labels, this is intended to facilitate explanation rather than to require or imply any particular operational order, unless expressly stated to the contrary. Note that the AMF is intended to be exemplary of various NFs (e.g., AMF, SMF, etc.) that can interact with the UDM in the manner shown in FIG. 5.

Operations 51-66 are substantially similar to those described above in relation to FIG. 4, with the differences being related to allocation of the shared-data-id. In the procedure shown in FIG. 4, any unique shared-data-id value can be allocated. In the procedure shown in FIG. 5, UDM 180 (operation 62) or UDR 200 (operation 59) generates a value that contains a token or "magic cookie" including two pieces of information: 1) a value autogenerated by the network (i.e., not allocated by the operator) for a 5G VN group dynamically created by AF; and 2) an external group ID for the 5G VN group, provided by the AF. This second value enables the UDM to fetch the external group ID to access the 5G VN group data, a subset of which is the shared data to be provided to serving AMF/SMF.

Consider an example where the AF 95 provides an External Group ID of "group-1@ericsson.com". In such case, an exemplary shared-data-id would be "aaa-bbb-ccc-5g-vn: group-1@ericsson.com: 123456789". The first part would be the token (aaa-bbb-ccc-5g-vn: group-1@ericsson. com:), with the optional last part (123456789) making up a full identifier. Note that this last part (123456789) is optional because the unique External Group ID is part of the token, so the shared-data-id is unique in the network so long as the prefix (or magic cookie) 25 "aaa-bbb-ccc-5g-vn:" is also unique.

Note that the procedure shown in FIG. 5 does not include operations similar to operations 31-33 in FIG. 4, since no new shared data resources is created in the UDR 200. Operations 68-77 in FIG. 5 are substantially similar to operations 37-45 of FIG. 4, with the main difference being the shared data retrieval by UDM 180 from UDR 200. In the procedure shown in FIG. 4, the UDM 180 behaves conventionally in retrieving the shared data from the shared data storage in UDR 200. In FIG. 5 operations 74-76, when UDM detects that the shared-data-id contains the token/magic cookie, it uses the External Group ID in the token to retrieve the 5G VN group data from UDR, and extracts the shared data from the 5G VN group data for sending to the AMF (or other NFs, such as SMF).

One benefit of the embodiments exemplified by FIG. 5 is no requirement for creating shared data in UDR 200, since that data is also part of the 5G VN group data stored at group creation by the AF. This avoids data duplication in UDR and the corresponding burden of keeping separately-stored 5G VN group data and shared data synchronized during their respective life cycles. However, unlike conventional shared data techniques, the shared-data-id value provided to AMFs (or other NFs, such as SMF) and provisioned in UE subscription data does not correspond to an actual shared data resource in UDR 200.

The embodiments described above can be further illustrated with reference to FIGS. 6-8, which depict exemplary methods (e.g., procedures) for a UDM, a UDR, and an AF, respectively. Put differently, various features of the operations described below correspond to various embodiments described above. The exemplary methods shown in FIGS. 6-8 can be used cooperatively (e.g., with each other and with other procedures described herein) to provide benefits, advantages, and/or solutions to problems described herein. Although the exemplary methods are illustrated in FIGS. 6-8 by specific blocks in particular orders, the operations corresponding to the blocks can be performed in different orders than shown and can be combined and/or divided into blocks and/or operations having different functionality than shown. Optional blocks and/or operations are indicated by dashed lines.

In particular, FIG. 6 illustrates an exemplary method (e.g., procedure) for a UDM 180 of a communication network (e.g., 5GC), according to various embodiments of the present disclosure. For example, the exemplary method shown in FIG. 6 can be performed by a UDM (or a network node hosting the same) such as described elsewhere herein.

The exemplary method can include the operations of block 610, where the UDM can receive a request, by an AF associated with the communication network, to create a virtual network (VN) group of users in the communication network, wherein the request includes VN group data and VN group size information. For example, the request can be received from the AF via a network exposure function (NEF) of the communication network.

The exemplary method can also include the operations of block 620, where the UDM can cause the VN group data to be stored, in a UDR of the communication network, in association with each of the users of the VN group. The exemplary method can also include the operations of block 630, where the UDM can, based on the VN group size information, determine that shared data storage is needed for a shared-data subset of the VN group data and obtain a shared data identifier (shared-data-id). The exemplary method can also include the operations of block 640, where the UDM can cause the shared-data-id to be stored in the UDR in association with the following: the shared-data subset of the VN group data; and each of the users in the VN group.

In some embodiments, the VN group size information includes one or more of the following: an actual or expected number of users comprising the VN group, and a growth rate for number of users comprising the VN group. In some embodiments, the shared-data subset of the VN group data includes network slice selection assistance information (NSSAI) and/or a data network name (DNN). In such case, the VN group data includes the shared-data subset and one or more of the following: a list of the users in the VN group, and an external identifier of the VN group.

In some embodiments, obtaining the shared-data-id in block 630 can include the operations of sub-blocks 631-632, where the UDM 180 can send, to the UDR 200, a request for a shared data identifier corresponding to a data type of the VN group data and receive the shared-data-id from the UDR in response to the request. Operations 22 and 24 or 58 to 60 in FIGS. 4A and 5A are examples of these embodiments.

In other embodiments, obtaining the shared-data-id in block 630 can include the operations of sub-block 633, where the UDM 180 can assign, as the shared-data-id, a value currently not used by the UDR as a shared data identifier. Operation 26 and 62 in FIGS. 4A and 5A are examples of these embodiments.

In some embodiments, the exemplary method can also include the operations of blocks 650-665. In blocks 650-655, the UDM can receive, from a NF of the communication network, a first request for subscription data associated with one of the users in the VN group and forward the first request to the UDR. In block 660, the UDM can receive the shared-data-id from the UDR and forward the shared-data-id to the NF. Operations 38-42 in FIG. 4C and operations 69-73 in FIG. 5C are examples of these embodiments. In block 665, the UDM can receive, from the NF, a second request for the shared-data subset of the VN group data, wherein the second request includes the shared-data-id.

In some of these embodiments, the UDM 180 causes (e.g., in block 640) the shared-data-id to be stored, in association with the shared-data subset, separately from the VN group data stored in association with each of the users of the VN group (e.g., in block 620). Furthermore, the exemplary method also includes the operations of blocks 670-675, where the UDM can forward the second request to the UDR 200, receive the shared-data subset from the UDR, and forward the shared-data subset to the NF. FIG. 4 shows an example of these embodiments.

In other of these embodiments, the shared-data-id includes a first portion comprising a unique value auto-generated by the UDM 180 or by the UDR 200 and a second portion comprising an external identifier of the VN group. For example, the unique value auto-generated by the UDM or by the UDR can be or include a token or a magic cookie, as discussed above. As another example, the first and second portions can be concatenated to form a single unique identifier, such as discussed above.

In such embodiments, the VN group data stored in association with each of the users of the VN group can include the external identifier of the VN group. In such case, the exemplary method also includes the operations of blocks 680-690, where the UDM can detect the external identifier of the VN group in the shared-data-id included in the second request, send the external identifier of the VN group to the UDR, receive the VN group data from the UDR, and forward the VN group data to the NF. FIG. 5 shows an example of these embodiments.

In some of these embodiments, the NF can be an AMF. In other of these embodiments, the NF can be an SMF.

In addition, FIG. 7 illustrates an exemplary method (e.g., procedure) for a UDR 200 of a communication network (e.g., 5GC), according to various embodiments of the present disclosure. For example, the exemplary method shown in FIG. 7 can be performed by a UDR (or a network node hosting the same) such as described elsewhere herein.

The exemplary method can include the operations of block 710, where the UDR 200 can, responsive to a UDM of the communication network, store VN group data in association with each of the users comprising the VN group. The exemplary method can also include the operations of block 750, where the UDR can, responsive to the UDM, store a shared data identifier (shared-data-id) in association with the following: a shared-data subset of the VN group data; and each of the users in the VN group.

In some embodiments, the shared-data subset of the VN group data includes network slice selection assistance information (NSSAI) and/or a data network name (DNN). In such case, the VN group data includes the shared-data subset and one or more of the following: a list of the users in the VN group, and an external identifier of the VN group.

In some embodiments, the exemplary method can also include the operations of blocks 720-740. In block 720, the UDR can receive, from the UDM, a request for a shared data identifier corresponding to a data type of the VN group data. In bock 730, the UDR can assign, as the shared-data-id, a value currently not used by the UDR as a shared data identifier. In block 740, the UDR can send the shared-data-id to the UDM in response to the request. Operations 22-24 and 58-60 in FIGS. 4A,B and 5A,B are examples of these embodiments.

In some embodiments, the exemplary method can also include the operations of blocks 755-765. In block 755, the UDR can receive, from the UDM, a first request for subscription data associated with one of the users in the VN group. In block 760, the UDR can send the shared-data-id to the UDM in response to the first request. In block 765, the UDR can receive, from the UDM, a second request for the shared-data subset of the VN group data. Operations 33-34 and 43 in FIG. 4C and operations 70-71 and 75 in FIG. 5C are examples of these embodiments.

In some of these embodiments, the shared-data-id is stored, in association with the shared-data subset, separately from the VN group data stored in association with each of the users of the VN group. Additionally, the second request (e.g., in block 765) includes the shared-data-id. In such embodiments, the exemplary method can also include the operations of blocks 770-775, where the UDR can obtain the shared-subset subset (e.g., from storage) based on the received shared-data-id and send the shared-data subset to the UDM 180 in response to the second request. Operation 44 in FIG. 4C is an example of these embodiments.

In other of these embodiments, the shared-data-id includes a first portion comprising a unique value auto-generated by the UDM 180 or by the UDR 200 and a second portion comprising an external identifier of the VN group. For example, the unique value auto-generated by the UDM or by the UDR can be or include a token or a magic cookie, as discussed above. As another example, the first and second portions can be concatenated to form a single unique identifier, such as discussed above. In such embodiments, the VN group data stored in association with each of the users of the VN group can include the external identifier of the VN group. Also, the second request (e.g., received in block 765) includes the external identifier of the VN group. In such case, the exemplary method also includes the operations of blocks 780-785, where the UDR can obtain the VN group data, including the shared-data subset, based on the received external identifier and send the VN group data to the UDM in response to the second request. Operation 76 in FIG. 5C is an example of these embodiments.

In addition, FIG. 8 illustrates an exemplary method (e.g., procedure) for an AF associated with a communication network (e.g., 5GC), according to various embodiments of the present disclosure. For example, the exemplary method shown in FIG. 8 can be performed by any appropriate AF (or a network node hosting the same) such as described elsewhere herein.

The exemplary method can include the operations of block 810, where the AF can send, to a UDM of the communication network, a request to create a VN group of users in the communication network. The request includes VN group data and VN group size information. In some embodiments, the request can be sent to the UDM via an NEF of the communication network.

In some embodiments, the VN group size information includes one or more of the following: an actual or expected number of users comprising the VN group, and a growth rate for number of users comprising the VN group. In some embodiments, the VN group data includes the following:

a shared-data subset, including one or more of the following: network slice selection assistance information (NSSAI), and data network name (DNN); and one or more of the following: a list of the users in the VN group, and an external identifier of the VN group.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 9:
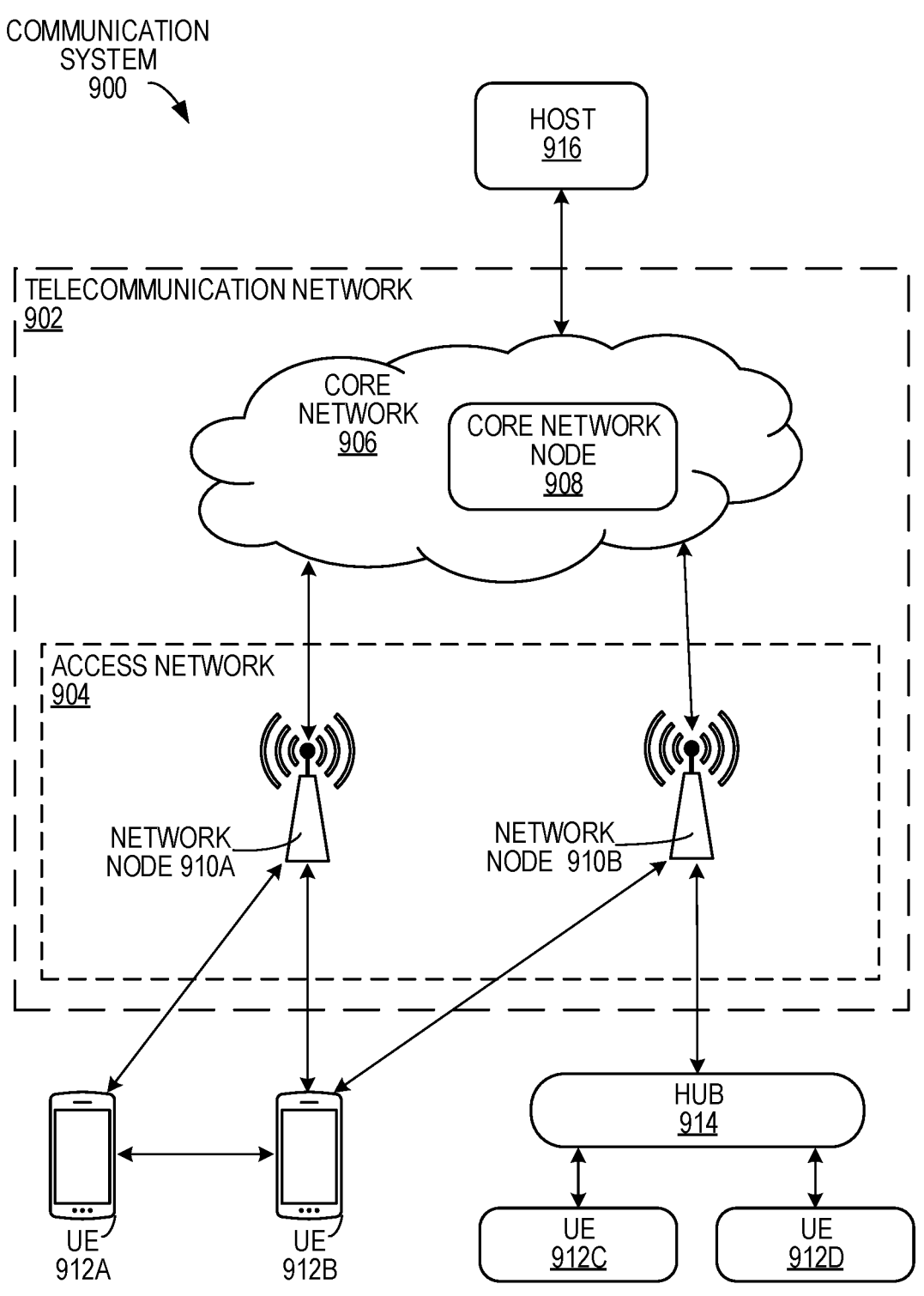
FIG. 9 shows a communication system according to various embodiments of the present disclosure.

FIG. 9 shows an example of a communication system 900 in accordance with some embodiments. In this example, the communication system 900 includes a telecommunication network 902 that includes an access network 904, such as a radio access network (RAN), and a core network 906, which includes one or more core network nodes 908. The access network 904 includes one or more access network nodes, such as network nodes 910a and 910b (one or more of which may be generally referred to as network nodes 910), or any other similar 3rd Generation Partnership Project (3GPP) access node or non-3GPP access point. The network nodes 910 facilitate direct or indirect connection of user equipment (UE), such as by connecting UEs 912a, 912b, 912c, and 912d (one or more of which may be generally referred to as UEs 912) to the core network 906 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 900 may include any number of wired or wireless networks, network nodes, UEs, and/or any other components or systems that may facilitate or participate in the communication of data and/or signals whether via wired or wireless connections. The communication system 900 may include and/or interface with any type of communication, telecommunication, data, cellular, radio network, and/or other similar type of system.

The UEs 912 may be any of a wide variety of communication devices, including wireless devices arranged, configured, and/or operable to communicate wirelessly with the network nodes 910 and other communication devices. Similarly, the network nodes 910 are arranged, capable, configured, and/or operable to communicate directly or indirectly with the UEs 912 and/or with other network nodes or equipment in the telecommunication network 902 to enable and/or provide network access, such as wireless network access, and/or to perform other functions, such as administration in the telecommunication network 902.

In the depicted example, the core network 906 connects the network nodes 910 to one or more hosts, such as host 916. These connections may be direct or indirect via one or more intermediary networks or devices. In other examples, network nodes may be directly coupled to hosts. The core network 906 includes one more core network nodes (e.g., core network node 908) that are structured with hardware and software components. Features of these components may be substantially similar to those described with respect to the UEs, network nodes, and/or hosts, such that the descriptions thereof are generally applicable to the corresponding components of the core network node 908. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management function (UDM), Unified Data Repository (UDR), Security Edge Protection Proxy (SEPP), Network Exposure Function (NEF), and/or a User Plane Function (UPF). As such, in some embodiments, core network node 908 can be configured to perform operations performed by any of these exemplary nodes in methods or procedures described above.

The host 916 may be under the ownership or control of a service provider other than an operator or provider of the access network 904 and/or the telecommunication network 902, and may be operated by the service provider or on behalf of the service provider. The host 916 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

In various embodiments, host 916 or core network node 908 can implement an application function (AF) associated with the communication system or network 900. In other words, the AF may be located in the core network 906 or coupled to the core network 906. Such an AF can be configured to perform operations corresponding to exemplary methods described above.

As a whole, the communication system 900 of FIG. 9 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 902 is a cellular network that implements 3GPP standardized features. Accordingly, the telecommunications network 902 may support network slicing to provide different logical networks to different devices that are connected to the telecommunication network 902. For example, the telecommunications network 902 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 912 are configured to transmit and/or receive information without direct human interaction. For instance, a UE may be designed to transmit information to the access network 904 on a predetermined schedule, when triggered by an internal or external event, or in response to requests from the access network 904. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 914 communicates with the access network 904 to facilitate indirect communication between one or more UEs (e.g., UE 912c and/or 912d) and network nodes (e.g., network node 910b). In some examples, the hub 914 may be a controller, router, content source and analytics, or any of the other communication devices described herein regarding UEs. For example, the hub 914 may be a broadband router enabling access to the core network 906 for the UEs. As another example, the hub 914 may be a controller that sends commands or instructions to one or more actuators in the UEs. Commands or instructions may be received from the UEs, network nodes 910, or by executable code, script, process, or other instructions in the hub 914. As another example, the hub 914 may be a data collector that acts as temporary storage for UE data and, in some embodiments, may perform analysis or other processing of the data. As another example, the hub 914 may be a content source. For example, for a UE that is a VR headset, display, loudspeaker or other media delivery device, the hub 914 may retrieve VR assets, video, audio, or other media or data related to sensory information via a network node, which the hub 914 then provides to the UE either directly, after performing local processing, and/or after adding additional local content. In still another example, the hub 914 acts as a proxy server or orchestrator for the UEs, in particular in if one or more of the UEs are low energy IoT devices.

The hub 914 may have a constant/persistent or intermittent connection to the network node 910b. The hub 914 may also allow for a different communication scheme and/or schedule between the hub 914 and UEs (e.g., UE 912c and/or 912d), and between the hub 914 and the core network 906. In other examples, the hub 914 is connected to the core network 906 and/or one or more UEs via a wired connection. Moreover, the hub 914 may be configured to connect to an M2M service provider over the access network 904 and/or to another UE over a direct connection. In some scenarios, UEs may establish a wireless connection with the network nodes 910 while still connected via the hub 914 via a wired or wireless connection. In some embodiments, the hub 914 may be a dedicated hub—that is, a hub whose primary function is to route communications to/from the UEs from/to the network node 910b. In other embodiments, the hub 914 may be a non-dedicated hub—that is, a device which is capable of operating to route communications between the UEs and network node 910b, but which is additionally capable of operating as a communication start and/or end point for certain data channels.

In some embodiments, core network node 908 shown in FIG. 9

Figure 10:
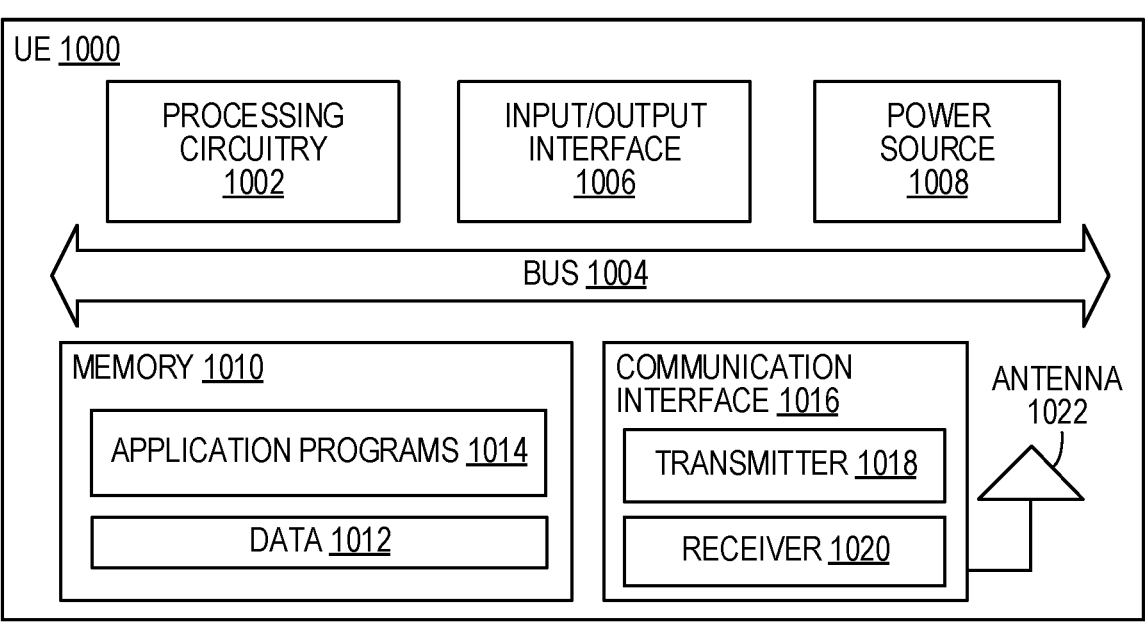
FIG. 10 shows a UE according to various embodiments of the present disclosure.

FIG. 10 shows a UE 1000 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1000 includes processing circuitry 1002 that is operatively coupled via a bus 1004 to an input/output interface 1006, a power source 1008, a memory 1010, a communication interface 1012, and/or any other component, or any combination thereof. Certain UEs may utilize all or a subset of the components shown in FIG. 10. The level of integration between the components may vary from one UE to another UE. Further, certain UEs may contain multiple instances of a component, such as multiple processors, memories, transceivers, transmitters, receivers, etc.

The processing circuitry 1002 is configured to process instructions and data and may be configured to implement any sequential state machine operative to execute instructions stored as machine-readable computer programs in the memory 1010. The processing circuitry 1002 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1002 may include multiple central processing units (CPUs).

In the example, the input/output interface 1006 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1000. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1008 is structured as a battery or battery pack. Other types of power sources, such as an external power source (e.g., an electricity outlet), photovoltaic device, or power cell, may be used. The power source 1008 may further include power circuitry for delivering power from the power source 1008 itself, and/or an external power source, to the various parts of the UE 1000 via input circuitry or an interface such as an electrical power cable. Delivering power may be, for example, for charging of the power source 1008. Power circuitry may perform any formatting, converting, or other modification to the power from the power source 1008 to make the power suitable for the respective components of the UE 1000 to which power is supplied.

The memory 1010 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1010 includes one or more application programs 1014, such as an operating system, web browser application, a widget, gadget engine, or other application, and corresponding data 1016. The memory 1010 may store, for use by the UE 1000, any of a variety of various operating systems or combinations of operating systems.

The memory 1010 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1010 may allow the UE 1000 to access instructions, application programs and the like, stored on transitory or non-transitory memory media, to off-load data, or to upload data. An article of manufacture, such as one utilizing a communication system may be tangibly embodied as or in the memory 1010, which may be or comprise a device-readable storage medium.

The processing circuitry 1002 may be configured to communicate with an access network or other network using the communication interface 1012. The communication interface 1012 may comprise one or more communication subsystems and may include or be communicatively coupled to an antenna 1022. The communication interface 1012 may include one or more transceivers used to communicate, such as by communicating with one or more remote transceivers of another device capable of wireless communication (e.g., another UE or a network node in an access network). Each transceiver may include a transmitter 1018 and/or a receiver 1020 appropriate to provide network communications (e.g., optical, electrical, frequency allocations, and so forth). Moreover, the transmitter 1018 and receiver 1020 may be coupled to one or more antennas (e.g., antenna 1022) and may share circuit components, software or firmware, or alternatively be implemented separately.

In the illustrated embodiment, communication functions of the communication interface 1012 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1012, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1000 shown in FIG. 10.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 11:
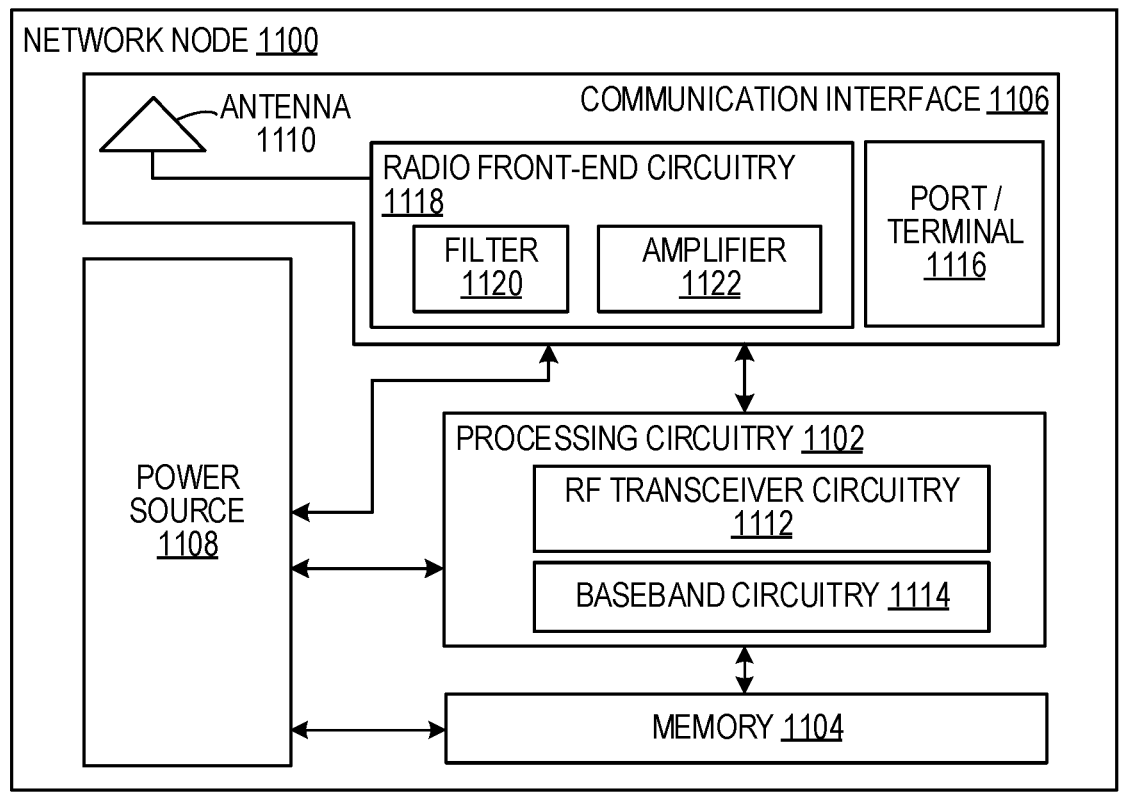
FIG. 11 shows a network node according to various embodiments of the present disclosure.

FIG. 11 shows a network node 1100 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1100 includes a processing circuitry 1102, a memory 1104, a communication interface 1106, and a power source 1108. The network node 1100 may be composed of multiple physically separate components (e.g., a NodeB component and a RNC component, or a BTS component and a BSC component, etc.), which may each have their own respective components. In certain scenarios in which the network node 1100 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1100 may be configured to support multiple radio access technologies (RATs). In such embodiments, some components may be duplicated (e.g., separate memory 1104 for different RATs) and some components may be reused (e.g., a same antenna 1110 may be shared by different RATs). The network node 1100 may also include multiple sets of the various illustrated components for different wireless technologies integrated into network node 1100, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1100.

The processing circuitry 1102 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1100 components, such as the memory 1104, to provide network node 1100 functionality.

In some embodiments, the processing circuitry 1102 includes a system on a chip (SOC). In some embodiments, the processing circuitry 1102 includes one or more of radio frequency (RF) transceiver circuitry 1112 and baseband processing circuitry 1114. In some embodiments, the radio frequency (RF) transceiver circuitry 1112 and the baseband processing circuitry 1114 may be on separate chips (or sets of chips), boards, or units, such as radio units and digital units. In alternative embodiments, part or all of RF transceiver circuitry 1112 and baseband processing circuitry 1114 may be on the same chip or set of chips, boards, or units.

The memory 1104 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1102. The memory 1104 may store any suitable instructions, data, or information, including a computer program, software, an application including one or more of logic, rules, code, tables, and/or other instructions capable of being executed by the processing circuitry 1102 and utilized by the network node 1100. The memory 1104 may be used to store any calculations made by the processing circuitry 1102 and/or any data received via the communication interface 1106. In some embodiments, the processing circuitry 1102 and memory 1104 is integrated.

The communication interface 1106 is used in wired or wireless communication of signaling and/or data between a network node, access network, and/or UE. As illustrated, the communication interface 1106 comprises port(s)/terminal(s) 1116 to send and receive data, for example to and from a network over a wired connection. The communication interface 1106 also includes radio front-end circuitry 1118 that may be coupled to, or in certain embodiments a part of, the antenna 1110. Radio front-end circuitry 1118 comprises filters 1120 and amplifiers 1122. The radio front-end circuitry 1118 may be connected to an antenna 1110 and processing circuitry 1102. The radio front-end circuitry may be configured to condition signals communicated between antenna 1110 and processing circuitry 1102. The radio front-end circuitry 1118 may receive digital data that is to be sent out to other network nodes or UEs via a wireless connection. The radio front-end circuitry 1118 may convert the digital data into a radio signal having the appropriate channel and bandwidth parameters using a combination of filters 1120 and/or amplifiers 1122. The radio signal may then be transmitted via the antenna 1110. Similarly, when receiving data, the antenna 1110 may collect radio signals which are then converted into digital data by the radio front-end circuitry 1118. The digital data may be passed to the processing circuitry 1102. In other embodiments, the communication interface may comprise different components and/or different combinations of components.

In certain alternative embodiments, the network node 1100 does not include separate radio front-end circuitry 1118, instead, the processing circuitry 1102 includes radio front-end circuitry and is connected to the antenna 1110. Similarly, in some embodiments, all or some of the RF transceiver circuitry 1112 is part of the communication interface 1106. In still other embodiments, the communication interface 1106 includes one or more ports or terminals 1116, the radio front-end circuitry 1118, and the RF transceiver circuitry 1112, as part of a radio unit (not shown), and the communication interface 1106 communicates with the baseband processing circuitry 1114, which is part of a digital unit (not shown).

The antenna 1110 may include one or more antennas, or antenna arrays, configured to send and/or receive wireless signals. The antenna 1110 may be coupled to the radio front-end circuitry 1118 and may be any type of antenna capable of transmitting and receiving data and/or signals wirelessly. In certain embodiments, the antenna 1110 is separate from the network node 1100 and connectable to the network node 1100 through an interface or port.

The antenna 1110, communication interface 1106, and/or the processing circuitry 1102 may be configured to perform any receiving operations and/or certain obtaining operations described herein as being performed by the network node. Any information, data and/or signals may be received from a UE, another network node and/or any other network equipment. Similarly, the antenna 1110, the communication interface 1106, and/or the processing circuitry 1102 may be configured to perform any transmitting operations described herein as being performed by the network node. Any information, data and/or signals may be transmitted to a UE, another network node and/or any other network equipment.

The power source 1108 provides power to the various components of network node 1100 in a form suitable for the respective components (e.g., at a voltage and current level needed for each respective component). The power source 1108 may further comprise, or be coupled to, power management circuitry to supply the components of the network node 1100 with power for performing the functionality described herein. For example, the network node 1100 may be connectable to an external power source (e.g., the power grid, an electricity outlet) via an input circuitry or interface such as an electrical cable, whereby the external power source supplies power to power circuitry of the power source 1108. As a further example, the power source 1108 may comprise a source of power in the form of a battery or battery pack which is connected to, or integrated in, power circuitry. The battery may provide backup power should the external power source fail.

Embodiments of the network node 1100 may include additional components beyond those shown in FIG. 11 for providing certain aspects of the network node's functionality, including any of the functionality described herein and/or any functionality necessary to support the subject matter described herein. For example, the network node 1100 may include user interface equipment to allow input of information into the network node 1100 and to allow output of information from the network node 1100. This may allow a user to perform diagnostic, maintenance, repair, and other administrative functions for the network node 1100.

In various embodiments, network node 1100 can be configured to perform operations performed by network nodes, network functions (NFs), and application functions (AFs) in exemplary methods or procedures described above.

Figure 12:
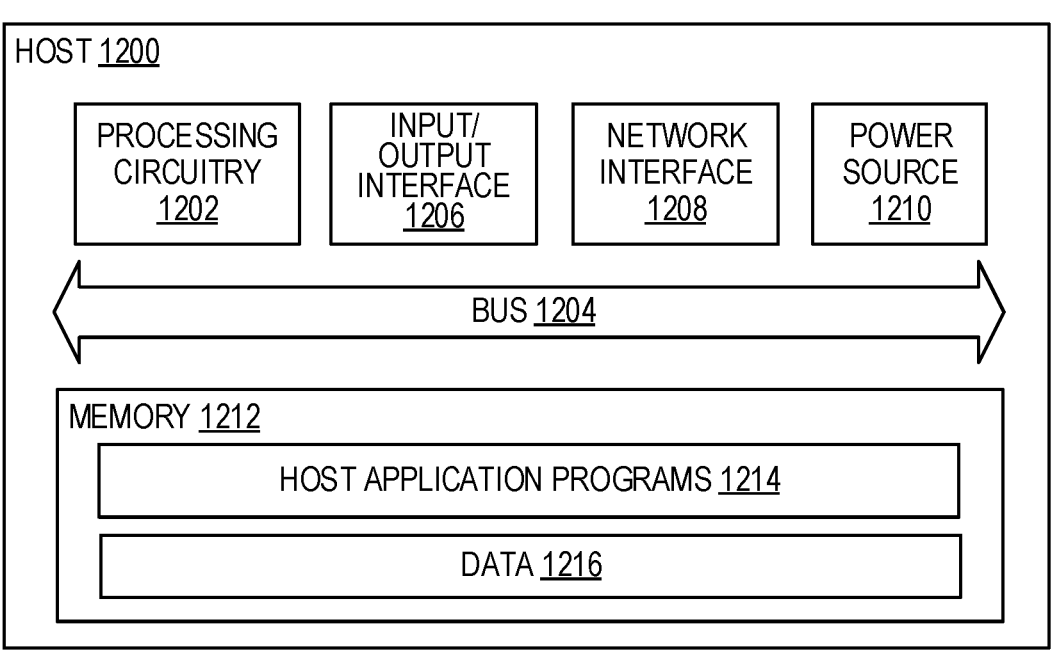
FIG. 12 shows host computing system according to various embodiments of the present disclosure.

FIG. 12 is a block diagram of a host 1200, which may be an embodiment of the host 916 of FIG. 9, in accordance with various aspects described herein. As used herein, the host 1200 may be or comprise various combinations hardware and/or software, including a standalone server, a blade server, a cloud-implemented server, a distributed server, a virtual machine, container, or processing resources in a server farm. The host 1200 may provide one or more services to one or more UEs.

The host 1200 includes processing circuitry 1202 that is operatively coupled via a bus 1204 to an input/output interface 1206, a network interface 1208, a power source 1210, and a memory 1212. Other components may be included in other embodiments. Features of these components may be substantially similar to those described with respect to the devices of previous figures, such as FIGS. 10 and 11, such that the descriptions thereof are generally applicable to the corresponding components of host 1200.

The memory 1212 may include one or more computer programs including one or more host application programs 1214 and data 1216, which may include user data, e.g., data generated by a UE for the host 1200 or data generated by the host 1200 for a UE. Embodiments of the host 1200 may utilize only a subset or all of the components shown. The host application programs 1214 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1214 may also provide for user authentication and licensing checks and may periodically report health, routes, and content availability to a central node, such as a device in or on the edge of a core network. Accordingly, the host 1200 may select and/or indicate a different host for over-the-top services for a UE. The host application programs 1214 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 13:
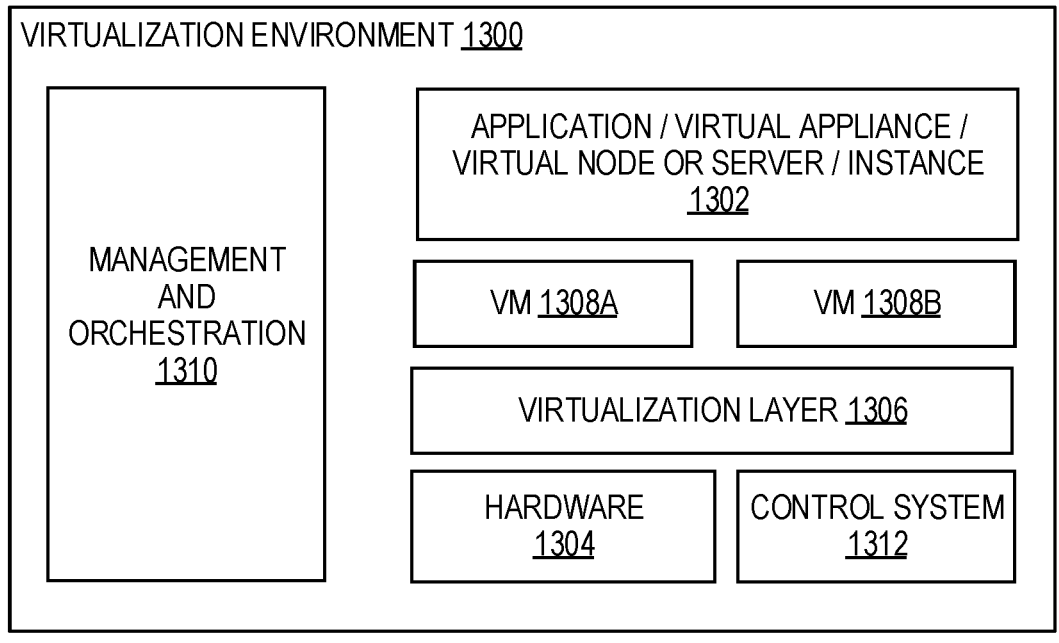
FIG. 13 is a block diagram of a virtualization environment in which functions implemented by some embodiments of the present disclosure may be virtualized.

FIG. 13 is a block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1300 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1302 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1304 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1306 (also referred to as hypervisors or virtual machine monitors (VMMs)), provide VMs 1308a and 1308b (one or more of which may be generally referred to as VMs 1308), and/or perform any of the functions, features and/or benefits described in relation with some embodiments described herein. The virtualization layer 1306 may present a virtual operating platform that appears like networking hardware to the VMs 1308.

The VMs 1308 comprise virtual processing, virtual memory, virtual networking or interface and virtual storage, and may be run by a corresponding virtualization layer 1306. Different embodiments of the instance of a virtual appliance 1302 may be implemented on one or more of VMs 1308, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1308 may be a software implementation of a physical machine that runs programs as if they were executing on a physical, non-virtualized machine. Each of the VMs 1308, and that part of hardware 1304 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1308 on top of the hardware 1304 and corresponds to the application 1302.

Hardware 1304 may be implemented in a standalone network node with generic or specific components. Hardware 1304 may implement some functions via virtualization. Alternatively, hardware 1304 may be part of a larger cluster of hardware (e.g., such as in a data center or CPE) where many hardware nodes work together and are managed via management and orchestration 1310, which, among others, oversees lifecycle management of applications 1302. In some embodiments, hardware 1304 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1312 which may alternatively be used for communication between hardware nodes and radio units.

In various embodiments, virtualization environment 1300 can be configured to host various network functions (NFs) and application functions (AFs) described above. In other words, these NFs and AFs can be implemented in respective virtual nodes 1302 based on underlying hardware 1304. These respective virtual nodes 1302 can be configured to perform various exemplary methods or procedures described above.

Figure 14:
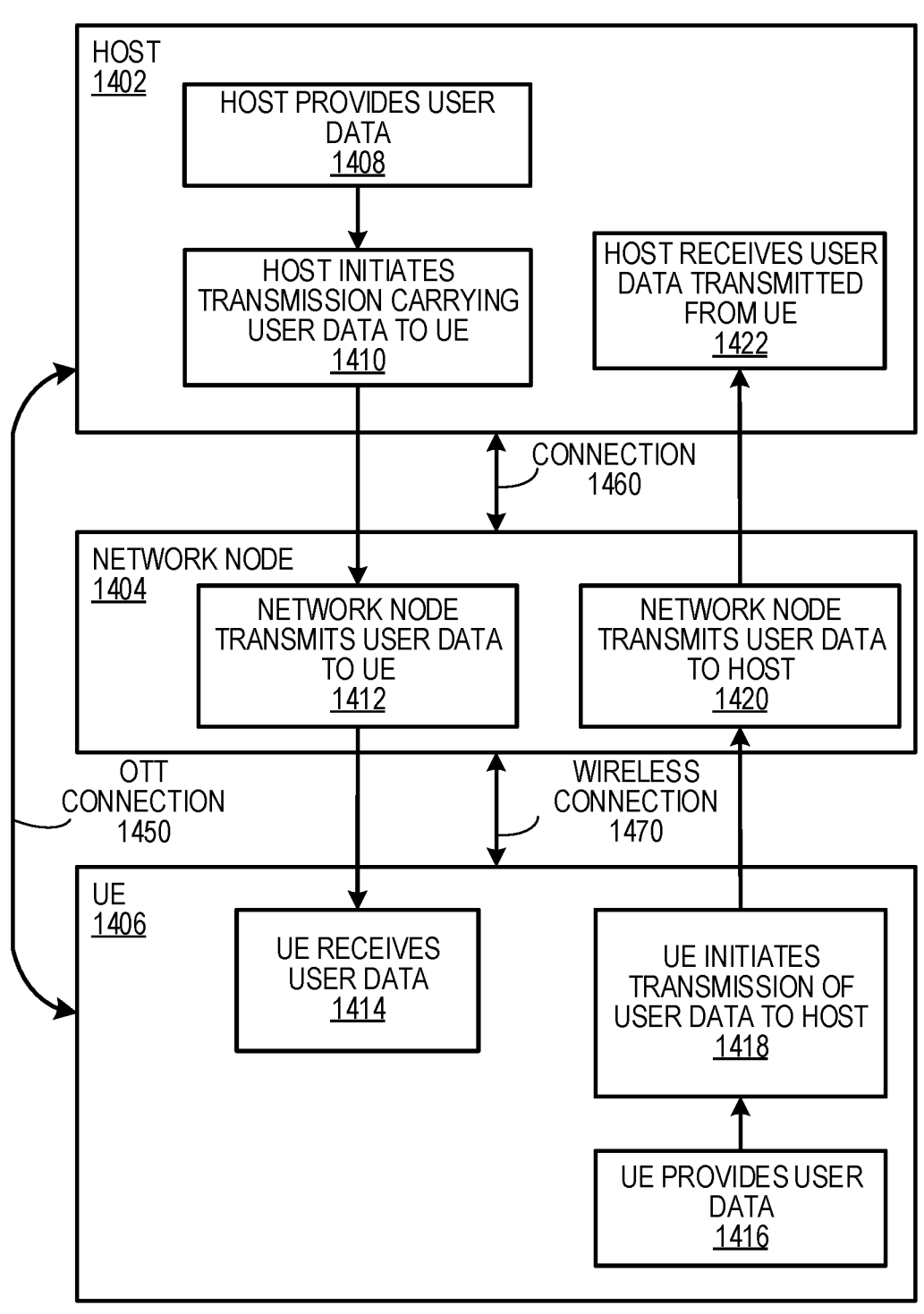
FIG. 14 illustrates communication between a host computing system, a network node, and a UE via multiple connections, according to various embodiments of the present disclosure.

FIG. 14 shows a communication diagram of a host 1402 communicating via a network node 1404 with a UE 1406 over a partially wireless connection in accordance with some embodiments. Example implementations, in accordance with various embodiments, of the UE (such as a UE 912*a* of FIG. 9 and/or UE 1000 of FIG. 10), network node (such as network node 910*a* of FIG. 9 and/or network node 1100 of FIG. 11), and host (such as host 916 of FIG. 9 and/or host 1200 of FIG. 12) discussed in the preceding paragraphs will now be described with reference to FIG. 14.

Like host 1200, embodiments of host 1402 include hardware, such as a communication interface, processing circuitry, and memory. The host 1402 also includes software, which is stored in or accessible by the host 1402 and executable by the processing circuitry. The software includes a host application that may be operable to provide a service to a remote user, such as the UE 1406 connecting via an over-the-top (OTT) connection 1450 extending between the UE 1406 and host 1402. In providing the service to the remote user, a host application may provide user data which is transmitted using the OTT connection 1450.

The network node 1404 includes hardware enabling it to communicate with the host 1402 and UE 1406. The connection 1460 may be direct or pass through a core network (like core network 906 of FIG. 9) and/or one or more other intermediate networks, such as one or more public, private, or hosted networks. For example, an intermediate network may be a backbone network or the Internet.

The UE 1406 includes hardware and software, which is stored in or accessible by UE 1406 and executable by the UE's processing circuitry. The software includes a client application, such as a web browser or operator-specific "app" that may be operable to provide a service to a human or non-human user via UE 1406 with the support of the host 1402. In the host 1402, an executing host application may communicate with the executing client application via the OTT connection 1450 terminating at the UE 1406 and host 1402. In providing the service to the user, the UE's client application may receive request data from the host's host application and provide user data in response to the request data. The OTT connection 1450 may transfer both the request data and the user data. The UE's client application may interact with the user to generate the user data that it provides to the host application through the OTT connection 1450.

The OTT connection 1450 may extend via a connection 1460 between the host 1402 and the network node 1404 and via a wireless connection 1470 between the network node 1404 and 20) the UE 1406 to provide the connection between the host 1402 and the UE 1406. The connection 1460 and wireless connection 1470, over which the OTT connection 1450 may be provided, have been drawn abstractly to illustrate the communication between the host 1402 and the UE 1406 via the network node 1404, without explicit reference to any intermediary devices and the precise routing of messages via these devices.

As an example of transmitting data via the OTT connection 1450, in step 1408, the host 1402 provides user data, which may be performed by executing a host application. In some embodiments, the user data is associated with a particular human user interacting with the UE 1406. In other embodiments, the user data is associated with a UE 1406 that shares data with the host 1402 without explicit human interaction. In step 1410, the host 1402 initiates a transmission carrying the user data towards the UE 1406. The host 1402 may initiate the transmission 30 responsive to a request transmitted by the UE 1406. The request may be caused by human interaction with the UE 1406 or by operation of the client application executing on the UE 1406. The transmission may pass via the network node 1404, in accordance with the teachings of the embodiments described throughout this disclosure. Accordingly, in step 1412, the network node 1404 transmits to the UE 1406 the user data that was carried in the transmission that the host 1402 initiated, in accordance with the teachings of the embodiments described throughout this disclosure. In step 1414, the UE 1406 receives the user data carried in the transmission, which may be performed by a client application executed on the UE 1406 associated with the host application executed by the host 1402.

In some examples, the UE 1406 executes a client application which provides user data to the host 1402. The user data may be provided in reaction or response to the data received from the host 1402. Accordingly, in step 1416, the UE 1406 may provide user data, which may be performed by executing the client application. In providing the user data, the client application may further consider user input received from the user via an input/output interface of the UE 1406. Regardless of the specific manner in which the user data was provided, the UE 1406 initiates, in step 1418, transmission of the user data towards the host 1402 via the network node 1404. In step 1420, in accordance with the teachings of the embodiments described throughout this disclosure, the network node 1404 receives user data from the UE 1406 and initiates transmission of the received user data towards the host 1402. In step 1422, the host 1402 receives the user data carried in the transmission initiated by the UE 1406.

One or more of the various embodiments improve the performance of OTT services provided to the UE 1406 using the OTT connection 1450, in which the wireless connection 1470 forms the last segment. More precisely, embodiments can provide automated procedures for a UDM to orchestrate and/or control the provisioning and configuration of shared data for dynamic 5G VN groups, thereby avoiding administrative burden that manual provisioning and configuration places on an MNO. Reducing administrative burdens in this manner can reduce operating expenses for the MNO. By having the expected 5G VN group size and/or growth, embodiments enable the MNO to better optimize 5GC resources (e.g., storage, computing, signaling, etc.) in support of the 5G VN group, which can lead to service level agreements (SLAs) with better pricing for the application provider relative to when the MNO is unaware of such information. These benefits are equally applicable to an application provider that delivers OTT services to a VN group over a 5G network.

In an example scenario, factory status information may be collected and analyzed by the host 1402. As another example, the host 1402 may process audio and video data which may have been retrieved from a UE for use in creating maps. As another example, the host 1402 may collect and analyze real-time data to assist in controlling vehicle congestion (e.g., controlling traffic lights). As another example, the host 1402 may store surveillance video uploaded by a UE. As another example, the host 1402 may store or control access to media content such as video, audio, VR or AR which it can broadcast, multicast or unicast to UEs. As other examples, the host 1402 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1450 between the host 1402 and UE 1406, in response to variations in the measurement results. The measurement procedure and/or the network functionality for reconfiguring the OTT connection may be implemented in software and hardware of the host 1402 and/or UE 1406. In some embodiments, sensors (not shown) may be deployed in or in association with other devices through which the OTT connection 1450 passes; the sensors may participate in the measurement procedure by supplying values of the monitored quantities exemplified above, or supplying values of other physical quantities from which software may compute or estimate the monitored quantities. The reconfiguring of the OTT connection 1450 may include message format, retransmission settings, preferred routing etc.; the reconfiguring need not directly alter the operation of the network node 1404. Such procedures and functionalities may be known and practiced in the art. In certain embodiments, measurements may involve proprietary UE signaling that facilitates measurements of throughput, propagation times, latency and the like, by the host 1402. The measurements may be implemented in that software causes messages to be transmitted, in particular empty or 'dummy' messages, using the OTT connection 1450 while monitoring propagation times, errors, etc.

FIG. 15 describes some of the steps carried out at the management entity managing the subscriber data, such as the UDM. In step 910 the management entity determines, based at least one group parameter, that a shared data identifier should be used for a virtual network group of subscribers, wherein members of the group of subscribers are among the plurality of subscribers and share at least one common parameter identified by the shared data identifier. In step 920 a generation of the shared data identifier to be used for the group of subscribers is initiated, and in step 930 the shared data identifier is associated with each member of the group of subscribers.

FIG. 16 describes some of the steps carried out at the subscriber data repository such as the UDR. In step 950 a request to generate a shared data identifier to be used for a virtual network group of subscribers, is received from a management entity configured to manage the subscriber data, wherein members of the group of subscribers are among the plurality of subscribers and share at least one common parameter identified by the shared data identifier. In step 960 the shared data identifier to be used for the group of subscribers is generated such that the shared data identifier contains an indicator including a first portion with a group identifier used for identifying the virtual network group, the indicator including a second portion indicating that the shared data identifier has been automatically generated by an application function in the cellular network. The shared data identifier is transmitted in step 970 with the indicator to the management entity.

Figure 17:
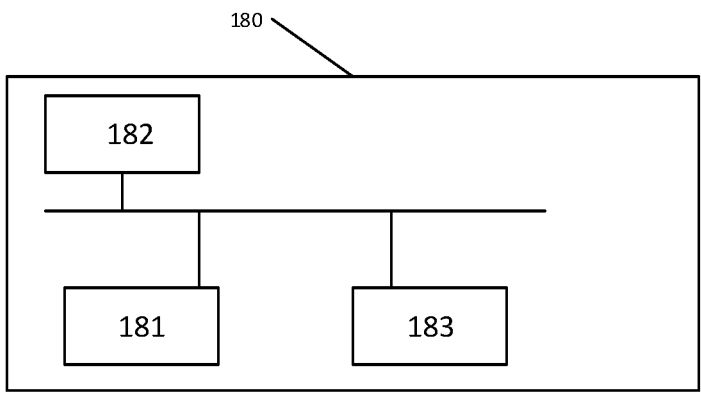
FIG. 17 shows an example schematic representation of a Management Entity managing subscriber data.

FIG. 17 shows a schematic architectural view of the management entity 180 which can initiate the generation and association of the shared data identifier. The entity 180 may be incorporated into any node present network, e.g. as UDM. The entity 180 comprises an interface 181 which is provided for transmitting user data or control messages to other entities and for receiving user data and control messages from other entities. The entity furthermore comprises a processing unit 182 which is responsible for the operation of the entity 180. The processing unit 182 comprises one or more processors and can carry out instructions stored on a memory 183, wherein the memory may include a read-only memory, a random access memory, a mass storage, a hard disk or the like. The memory can furthermore include suitable program code to be executed by the processing unit 182 so as to implement the above described functionalities in which the entity 180 is involved.

Figure 18:
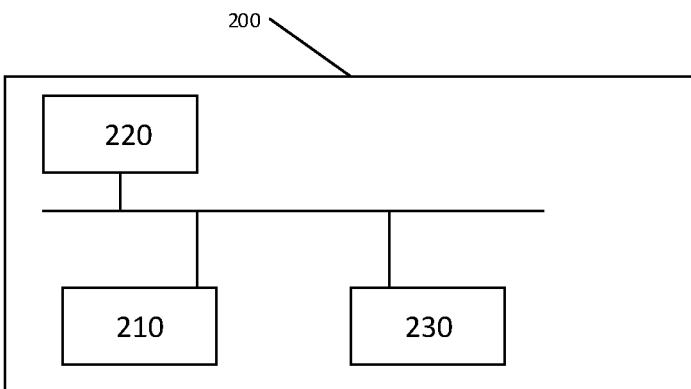
FIG. 18 shows an example schematic representation of a Subscriber Data Repository for subscribers of the communication network.

FIG. 18 shows a schematic architectural view of the subscriber data repository 200 which can initiate the generation and association of the shared data identifier. The entity 200 may be incorporated into any node present network, e.g. as UDR. The entity 200 comprises an interface 210 which is provided for transmitting user data or control messages to other entities and for receiving user data and control messages from other entities. The entity furthermore comprises a processing unit 220 which is responsible for the operation of the entity 180. The processing unit 220 comprises one or more processors and can carry out instructions stored on a memory 230, wherein the memory may include a read-only memory, a random access memory, a mass storage, a hard disk or the like. The memory can furthermore include suitable program code to be executed by the processing unit 220 so as to implement the above described functionalities in which the entity 200 is involved.

From the above said, some further general conclusions can be drawn.

As far as the management entity is concerned, it can receive a request to create the virtual network, VN, group of subscribers, the request comprising an indication about an expected number for the members of the group, as the group parameter, wherein it is determined based on the expected number for the members that the shared data identifier should be used. The management entity can determine to use the shared data identifier for the members of the group, when an expected number for the members used as the group parameter is higher than a threshold value.

The shared data identifier is preferably unique in the cellular network.

Preferably the shared data identifier is stored at the management entity and the management entity initiates a storing of the shared data identifier in a subscriber data repository configured to store the subscription data of the plurality of subscribers.

For initiating the creation of the indication it is possible that the management entity itself generates the shared data identifier or it requests the subscriber data repository to generate the shared data identifier, wherein the created shared data identifier is received from the user data repository.

The management entity can initiate an allocation of the shared data identifier before the generation of the shared data identifier is initiated.

The management entity can further request a subscriber data repository to generate the shared data identifier, wherein the received shared data identifier contains an indicator including a first portion including a group identifier used for identifying the virtual network group, the indicator including a second portion indicating that the shared data identifier has been automatically generated by an application function in the cellular network.

The management entity can, for associating the shared data identifier update a subscriber data repository for each member of the virtual network group of subscribers with the shared data identifier.

The at least one group parameter can include an actual or expected number of members of the group and/or a growth rate of the number of members of the group, e.g. a number of UEs per month or a percentage per month or year.

It is possible that the request to create the VN group of subscribers includes VN group data and VN group size information including the expected number for the members of the group. Here the management entity can cause the VN group data to be stored in a subscriber data repository in association with each member of the VN group of subscriber, and, based on the group size information, determine that shared data storage is needed for a shared-data subset of the VN group data. Additionally it can cause the shared data identifier to be stored in a subscriber data repository in association with the shared data subset of the VN group data and each member of the VN group.

As far as the subscriber data repository is concerned, it can store, in response to a request received from the management entity, virtual network group data in association with each of the members in the virtual network group, wherein the shared data identifier is stored in association with a shared data subset of the virtual network group data and each of the subscribers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Examples of the techniques and apparatus described herein include, but are not limited to, the following enumerated embodiments:

A1. A method for a unified data management function (UDM) of a communication network, the method comprising:

receiving a request, by an application function (AF) associated with the communication network, to create a virtual network (VN) group of users in the communication network, wherein the request includes VN group data and VN group size information;

causing the VN group data to be stored, in a unified data repository (UDR) of the communication network, in association with each of the users of the VN group;

based on the VN group size information, determining that shared data storage is needed for a shared-data subset of the VN group data and obtaining a shared data identifier (shared-data-id); and causing the shared-data-id to be stored in the UDR in association with the following: the shared-data subset of the VN group data; and each of the users in the VN group.

A2. The method of embodiment A1, wherein the VN group size information includes one or more of the following:

an actual or expected number of users comprising the VN group, and a growth rate for number of users comprising the VN group.

A3. The method of any of embodiments A1-A2, wherein:

the shared-data subset of the VN group data includes one or more of the following: network slice selection assistance information (NSSAI), and a data network name (DNN); and the VN group data includes the shared-data subset and one or more of the following: a list of the users in the VN group, and an external identifier of the VN group.

A4. The method of any of embodiments A1-A3, wherein obtaining the shared-data-id comprises:

sending, to the UDR, a request for a shared data identifier corresponding to a data type of the VN group data; and receiving the shared-data-id from the UDR in response to the request.

A4. The method of any of embodiments A1-A3, wherein obtaining the shared-data-id comprises the UDM assigning, as the shared-data-id, a value currently not used by the UDR as a shared data identifier.

A5. The method of any of embodiments A1-A4, further comprising:

receiving, from a network function (NF) of the communication network, a first request for subscription data associated with one of the users in the VN group;

forwarding the first request to the UDR;

receiving the shared-data-id from the UDR and forwarding the shared-data-id to the NF; and receiving, from the NF, a second request for the shared-data subset of the VN group data, wherein the second request includes the shared-data-id.

A6. The method of embodiment A5, wherein:

the UDM causes the shared-data-id to be stored, in association with the shared-data subset, separately from the VN group data stored in association with each of the users of the VN group; and the method further comprises:

forwarding the second request to the UDR; and receiving the shared-data subset from the UDR and forwarding the shared-data subset to the NF.

A7. The method of embodiment A5, wherein the shared-data-id includes:

a first portion comprising a unique value auto-generated by the UDM or by the UDR; and a second portion comprising an external identifier of the VN group.

A8. The method of embodiment A7, wherein one or more of the following applies:

the first and second portions are concatenated to form a single unique identifier; and the unique value auto-generated by the UDM or by the UDR comprises a token or a magic cookie.

A9. The method of any of embodiments A7-A8, wherein:

the VN group data stored in association with each of the users of the VN group includes the external identifier of the VN group; and the method further comprises:

detecting the external identifier of the VN group in the shared-data-id included in the second request;

sending the external identifier of the VN group to the UDR; and receiving the VN group data from the UDR and forwarding the VN group data to the NF.

A9a. The method of any of embodiments A5-A9, wherein the NF is one of the following: an access and mobility management function (AMF), or a session management function (SMF).

A10. The method of any of embodiments A1-A9a, wherein the request is received from the AF via a network exposure function (NEF) of the communication network.

B1. A method for a unified data repository (UDR) of a communication network, the method comprising:

responsive to a unified data management function (UDM) of the communication network, storing virtual network (VN) group data in association with each of the users comprising the VN group; and responsive to the UDM, storing a shared data identifier (shared-data-id) in association with the following:

a shared-data subset of the VN group data; and each of the users in the VN group.

B2. The method of embodiment B1, wherein:

the shared-data subset of the VN group data includes one or more of the following:

network slice selection assistance information (NSSAI), and data network name (DNN); and the VN group data includes the shared-data subset and one or more of the following: a list of the users in the VN group, and an external identifier of the VN group.

B3. The method of any of embodiments B1-B2, further comprising:

receiving, from the UDM, a request for a shared data identifier corresponding to a data type of the VN group data;

assigning, as the shared-data-id, a value currently not used by the UDR as a shared data identifier; and sending the shared-data-id to the UDM in response to the request.

B4. The method of any of embodiments B1-B3, further comprising:

receiving, from the UDM, a first request for subscription data associated with one of the users in the VN group;

sending the shared-data-id to the UDM in response to the first request; and receiving, from the UDM, a second request for the shared-data subset of the VN group data.

B5. The method of embodiment B4, wherein:

the shared-data-id is stored, in association with the shared-data subset, separately from the VN group data stored in association with each of the users of the VN group;

the second request includes the shared-data-id; and the method further comprises:

obtaining the shared-subset subset based on the received shared-data-id; and sending the shared-data subset to the UDM in response to the second request.

B6. The method of embodiment B4, wherein the shared-data-id includes:

a first portion comprising a unique value auto-generated by the UDM or by the UDR; and a second portion comprising an external identifier of the VN group.

B7. The method of embodiment B6, wherein one or more of the following applies:

the first and second portions are concatenated to form a single unique identifier; and the unique value auto-generated by the UDM or by the UDR comprises a token or a magic cookie.

B8. The method of any of embodiments B6-B7, wherein:

the VN group data stored in association with each of the users of the VN group includes the external identifier of the VN group;

the second request includes the external identifier of the VN group; and the method further comprises:

obtaining the VN group data, including the shared-data subset, based on the received external identifier; and sending the VN group data to the UDM in response to the second request.

C1. A method for an application function (AF) associated with a communication network, the method comprising:

sending, to a unified data management function (UDM) of the communication network, a request to create a virtual network (VN) group of users in the communication network, wherein the request includes VN group data and VN group size information.

C2. The method of embodiment C1, wherein the VN group size information includes one or more of the following:

an actual or expected number of users comprising the VN group, and a growth rate for number of users comprising the VN group.

C3. The method of any of embodiments C1-C2, wherein the VN group data includes:

a shared-data subset, including one or more of the following: network slice selection assistance information (NSSAI), and data network name (DNN); and one or more of the following: a list of the users in the VN group, and an external identifier of the VN group.

C4. The method of any of embodiments C1-C3, wherein the request is sent to the UDM via a network exposure function (NEF) of the communication network.

D1. A unified data management function (UDM) of a communication network, wherein:

the UDM is implemented by communication interface circuitry and processing circuitry that are operably coupled; and the processing circuitry and interface circuitry are configured to perform operations corresponding to any of the methods of embodiments A1-A10.

D2. A unified data management function (UDM) of a communication network, the UDM being configured to perform operations corresponding to any of the methods of embodiments A1-A10.

D3. A non-transitory, computer-readable medium storing computer-executable instructions that, when executed by processing circuitry associated with a unified data management function (UDM) of a communication network, configure the UDM to perform operations corresponding to any of the methods of embodiments A1-A10.

D4. A computer program product comprising computer-executable instructions that, when executed by processing circuitry associated with a unified data management function (UDM) of a communication network, configure the UDM to perform operations corresponding to any of the methods of embodiments A1-A10.

E1. A unified data repository (UDR) of a communication network, wherein:

the UDM is implemented by communication interface circuitry and processing circuitry that are operably coupled; and the processing circuitry and interface circuitry are configured to perform operations corresponding to any of the methods of embodiments B1-B8.

E2. A unified data repository (UDR) of a communication network, the UDR being configured to perform operations corresponding to any of the methods of embodiments B1-B8.

E3. A non-transitory, computer-readable medium storing computer-executable instructions that, when executed by processing circuitry associated with a unified data repository (UDR) of a communication network, configure the UDR to perform operations corresponding to any of the methods of embodiments B1-B8.

E4. A computer program product comprising computer-executable instructions that, when executed by processing circuitry associated with a unified data repository (UDR) of a communication network, configure the UDR to perform operations corresponding to any of the methods of embodiments B1-B8.

F1. An application function (AF) associated with a communication network, wherein: the AF is implemented by communication interface circuitry and processing circuitry that are operably coupled; and the processing circuitry and interface circuitry are configured to perform operations corresponding to any of the methods of embodiments C1-C4.

F2. An application function (AF) associated with a communication network, the AF being configured to perform operations corresponding to any of the methods of embodiments C1-C4.

F3. A non-transitory, computer-readable medium storing computer-executable instructions that, when executed by processing circuitry associated with an application function (AF) associated with a communication network, configure the AF to perform operations corresponding to any of the methods of embodiments C1-C4.

F4. A computer program product comprising computer-executable instructions that, when executed by processing circuitry associated with an application function (AF) associated with a communication network, configure the AF to perform operations corresponding to any of the methods of embodiments C1-C4.

The invention claimed is:

1. A method carried out at a management entity configured to manage subscriber data of a plurality of subscribers in a cellular network, the method comprising:

determining, based at least one group parameter, that a shared data identifier should be used for a virtual network group of subscribers, members of the group of subscribers being among the plurality of subscribers and sharing at least one common parameter identified by the shared data identifier;

initiating a generation of the shared data identifier to be used for the group of subscribers; and associating the shared data identifier with each member of the group of subscribers.

2. The method of claim 1, further receiving a request to create the virtual network, VN, group of subscribers, the request comprising an indication about an expected number for the members of the group, as the group parameter, wherein it is determined based on the expected number for the members that the shared data identifier should be used.

3. The method of claim 1, wherein it is determined to use the shared data identifier for the members of the group, when an expected number for the members used as the group parameter is higher than a threshold value.

4. The method of claim 1, wherein the shared data identifier is unique in the cellular network.

5. The method of claim 1, wherein the shared data identifier is stored at the management entity and initiating a storing of the shared data identifier in a subscriber data repository configured to store the subscription data of the plurality of subscribers.

6. The method of claim 1, wherein initiating the creation of the indicator comprises at least one of the following:

generating the shared data identifier at the management entity; and requesting a subscriber data repository to generate the shared data identifier, wherein the created shared data identifier is received from the user data repository.

7. The method of claim 1, wherein before the generation of the shared data identifier is initiated, an allocation of the shared data identifier is initiated.

8. The method of claim 1, further requesting a subscriber data repository to generate the shared data identifier, wherein the received shared data identifier contains an indicator including a first portion including a group identifier used for identifying the virtual network group, the indicator including a second portion indicating that the shared data identifier has been automatically generated by an application function in the cellular network.

9. The method of claim 1, wherein associating the shared data identifier comprises updating a subscriber data repository for each member of the virtual network group of subscribers with the shared data identifier.

10. The method of claim 1, wherein the at least one group parameter comprises at least one of the following:

an actual or expected number of members of the group; and a growth rate for the number of members of the group.

11. The method of claim 2, wherein the request to create the VN group of subscribers includes VN group data and VN group size information including the expected number for the members of the group, the method comprising:

causing the VN group data to be stored in a subscriber data repository in association with each member of the VN group of subscribers;

based on the group size information, determining that shared data storage is needed for a shared-data subset of the VN group data; and causing the shared data identifier to be stored in a subscriber data repository in association with the shared data subset of the VN group data and each member of the VN group.

12. A method carried out at a subscriber data repository for a plurality of subscribers of a cellular network, the method comprising:

receiving, from a management entity configured to manage subscriber data, a request to generate a shared data identifier to be used for a virtual network group of subscribers, members of the group of subscribers being among the plurality of subscribers sharing at least one common parameter identified by the shared data identifier;

generating the shared data identifier to be used for the group of subscribers, such that the shared data identifier contains an indicator including a first portion with a group identifier used for identifying the virtual network group, the indicator including a second portion indicating that the shared data identifier has been automatically generated by an application function in the cellular network; and transmitting the shared data identifier with the indicator to the management entity.

13. The method of claim 12, further comprising:

storing, in response to a request received from the management entity, virtual network group data in association with each of the members in the virtual network group, wherein the shared data identifier is stored in association with a shared data subset of the virtual network group data and each of the subscribers.

14. A management entity configured to manage subscriber data of a plurality of subscribers in a cellular network, the management entity comprising a memory and at least one processing unit, the memory containing instructions executable by the at least one processing unit to configure the management entity to:

determine, based at least one group parameter, that a shared data identifier should be used for a virtual network group of subscribers, members of the group of subscribers being among the plurality of subscribers and sharing at least one common parameter identified by the shared data identifier;

initiate a generation of the shared data identifier to be used for the group of subscribers; and associate the shared data identifier with each member of the group of subscribers.

15. The management entity of claim 14, further configured to receive request to create the virtual network, VN, group of subscribers, the request comprising an indication about an expected number for the members of the group, as the group parameter, wherein it is determined based on the expected number for the members that the shared data identifier should be used.

16. The management entity of claim 14, further configured to determine to use the shared data identifier for the members of the group, when an expected number for the members used as the group parameter is higher than a threshold value.

17. The management entity of claim 14, wherein the shared data identifier is unique in the cellular network.

18. The management entity of claim 14, further configured to store the shared data identifier at the management entity and to initiate a storing of the shared data identifier in a subscriber data repository configured to store the subscription data of the plurality of subscribers.

19. The management entity of claim 14, further configured, to initiate the creation of the indicator, to carry out at least one of the following:

generate the shared data identifier at the management entity; and request a subscriber data repository to generate the shared data identifier, wherein the created shared data identifier is received from the user data repository.

20. The management entity of claim 14, further configured to initiate an allocation of the shared data identifier, before the generation of the shared data identifier is initiated.

21. A subscriber data repository for a plurality of subscribers of a cellular network, the subscriber repository comprising a memory and at least one processing unit, the memory containing instructions executable by the at least one processing unit to configure the subscriber repository to:

receive, from a management entity configured to manage subscriber data, a request to generate a shared data identifier to be used for a virtual network group of subscribers, members of the group of subscribers being among the plurality of subscribers sharing at least one common parameter identified by the shared data identifier;

generate the shared data identifier to be used for the group of subscribers, such that the shared data identifier contains an indicator including a first portion with a group identifier used for identifying the virtual network group, the indicator including a second portion indicating that the shared data identifier has been automatically generated by an application function in the cellular network; and transmit the shared data identifier with the indicator to the management entity.

22. The subscriber data repository of claim 21, further configured to store, in response to a request received from the management entity, virtual network group data in association with each of the members in the virtual network group, wherein the shared data identifier is stored in association with a shared data subset of VN group data and each of the subscribers.

\* \* \* \* \*